US008583512B1

(12) United States Patent
Gupta

(10) Patent No.: US 8,583,512 B1
(45) Date of Patent: Nov. 12, 2013

(54) SEGREGATED ELECTRONIC SHOPPING LISTS FOR RECURRING ITEM PURCHASES

(75) Inventor: Anirma R. Gupta, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 189 days.

(21) Appl. No.: 12/982,793

(22) Filed: Dec. 30, 2010

(51) Int. Cl.
*G06Q 30/00* (2012.01)

(52) U.S. Cl.
USPC .................. 705/26.8; 705/26.1; 705/27.1

(58) Field of Classification Search
USPC ...................................... 705/26.1, 27.1, 26.8
See application file for complete search history.

(56) References Cited

U.S. PATENT DOCUMENTS

| 6,026,376 | A | 2/2000 | Kenney |
| 6,487,540 | B1 | 11/2002 | Smith et al. |
| 6,738,749 | B1 | 5/2004 | Chasko |
| 7,130,814 | B1 | 10/2006 | Szabo |
| 7,353,194 | B1 | 4/2008 | Kerker et al. |
| 7,455,226 | B1 | 11/2008 | Hammond et al. |
| 7,552,087 | B2 | 6/2009 | Schultz et al. |
| 7,555,476 | B2 | 6/2009 | Holbrook |
| 7,742,989 | B2 | 6/2010 | Schultz |
| 7,792,709 | B1 | 9/2010 | Trandal et al. |
| 7,987,120 | B2 | 7/2011 | Shiftan et al. |
| 8,095,439 | B1 | 1/2012 | Harman et al. |
| 2001/0029483 | A1 | 10/2001 | Schultz et al. |
| 2001/0037207 | A1 | 11/2001 | Dejaeger |
| 2002/0069115 | A1 | 6/2002 | Fitzpatrick |
| 2003/0020762 | A1 | 1/2003 | Budrys et al. |
| 2003/0126020 | A1 | 7/2003 | Smith et al. |
| 2004/0220964 | A1 | 11/2004 | Shiftan et al. |
| 2004/0225567 | A1 | 11/2004 | Mitchell et al. |
| 2005/0049928 | A1 | 3/2005 | Naick et al. |
| 2005/0080683 | A1 * | 4/2005 | Jordan ............................ 705/26 |
| 2006/0038003 | A1 | 2/2006 | Wakasa et al. |
| 2006/0273163 | A1 | 12/2006 | Gusler et al. |
| 2007/0069013 | A1 | 3/2007 | Seifert et al. |
| 2007/0094087 | A1 | 4/2007 | Mitchell et al. |
| 2007/0164106 | A1 | 7/2007 | McDevitt et al. |
| 2007/0288322 | A1 | 12/2007 | Watanabe |
| 2008/0235749 | A1 | 9/2008 | Jain et al. |
| 2009/0096590 | A1 | 4/2009 | Grundelman |
| 2009/0271265 | A1 | 10/2009 | Lay et al. |
| 2010/0257066 | A1 | 10/2010 | Jones et al. |
| 2010/0306080 | A1 | 12/2010 | Trandal et al. |
| 2011/0125598 | A1 | 5/2011 | Shin et al. |

OTHER PUBLICATIONS

File History of U.S. Appl. No. 12/609,922, filed Oct. 30, 2009.

(Continued)

*Primary Examiner* — Courtney Stopp
(74) *Attorney, Agent, or Firm* — Vista IP Law Group LLP

(57) ABSTRACT

Systems, computer-implemented methods and computer program products for generating customized shopping lists for recurring purchases of the same item based upon item-level electronic transaction data. Item-level electronic transaction data is analyzed to determine purchase intervals of items and estimate when the consumer will purchase the items again. Segregated, customized shopping lists are generated such that shopping lists have identified items when it is estimated that the consumer will need to purchase the items again. Multiple shopping lists may be segregated by merchant such that consumers have two more different lists of items for different merchants for a given estimated date. For example, a consumer may be provided with a first shopping list for a grocery store such as SAFEWAY, a second shopping list for a warehouse club store such as COSTCO, and a third shopping list for a big box store or superstore such as TARGET.

43 Claims, 18 Drawing Sheets

(56) References Cited

OTHER PUBLICATIONS

Office Action dated Dec. 30, 2010 in U.S. Appl. No. 12/609,922, filed Oct. 30, 2009 (22 pages).
Interview Summary dated Mar. 8, 2011 in U.S. Appl. No. 12/609,922, filed Oct. 30, 2009 (3 pages).
Amendment dated Mar. 30, 2011 in U.S. Appl. No. 12/609,922, filed Oct. 30, 2009 (9 pages).
Interview Summary dated May 23, 2011 in U.S. Appl. No. 12/609,922, filed Oct. 30, 2009 (3 pages).
Amendment dated Jun. 13, 2011 in U.S. Appl. No. 12/609,922, filed Oct. 30, 2009 (13 pages).
File History of U.S. Appl. No. 12/650,343, filed Dec. 30, 2009.
Office Action dated Aug. 29, 2011 in U.S. Appl. No. 12/650,343, filed Oct. 30, 2009 (25 pages).
Interview Summary dated Nov. 21, 2011 in U.S. Appl. No. 12/650,343, filed Oct. 30, 2009 (3 pages).
http://www.bnet.com/blog/mobile-internet/the-future-of-online-coupons-scarily-personalized-offers-based-on-your-history/692 (7 pages).
"Bippy", Jul. 29, 2010, http://bippy.com.internet (5 pages).
"The Neat Company", Jul. 29, 2010, http://www.neatco.com.internet (7 pages).
"The Neat Company User Guide", Jul. 29, 2010, http://www.neatco.com/media/12224/neatworks4_guide2.pdf.internet (147 pages).
"Quick Receipts", Jul. 29, 2010, http://myquickreceipts.intuit.com/.internet (12 pages).
"The Smart Refrigerator", Jul. 29, 2010, http://cs.nyu.edu/~jml1414/ui/assign3/smart_refrig.html.internet (3 pages).
File History of U.S. Appl. No. 12/625,540, filed Nov. 24, 2009.
Office Action dated Oct. 3, 2011 in U.S. Appl. No. 12/625,540, filed Nov. 24, 2009 (15 pages).
Notice of Allowance dated Oct. 11, 2011 in U.S. Appl. No. 12/609,922, filed Oct. 30, 2009.
Interview Summary dated Mar. 14, 2012, Office Action dated May 22, 2012, Amendment dated Aug. 21, 2012 and Final Office Action dated Sep. 26, 2012 in U.S. Appl. No. 13/286,101, filed Oct. 31, 2009, (53 pages).
Amendment dated Nov. 29, 2011, Final Office Action dated Apr. 16, 2012 and Amendment dated Jul. 16, 2012 in U.S. Appl. No. 12/650,343, filed Dec. 30, 2009, (58 pages).
Office Action dated Aug. 27, 2012 in U.S. Appl. No. 12/846,701, filed Jul. 29, 2010, (12 pages).
Amendment dated Feb. 3, 2012 and Final Office Action dated Apr. 5, 2012 in U.S. Appl. No. 12/625,540, filed Nov. 24, 2009, (34 pages).
Interview Summary dated Nov. 16, 2012, Amendment dated Nov. 26, 2012 and Final Office Action dated Feb. 26, 2013 in U.S. Appl. No. 12/846,701, filed Jul. 29, 2010, (26 pages).
Office Action dated Nov. 13, 2012, Interview Summary dated Feb. 7, 2013 and Amendment dated Feb. 13, 2012 in U.S. Appl. No. 13/008,808, filed Jan. 18, 2011, (49 pages).

\* cited by examiner

400

ITEM-LEVEL ELECTRONIC TRANSACTION DATA

| Consumer ID (402) | Purchase Date (404) | Item ID (406) | Quantity (408) |
|---|---|---|---|
| Consumer ID 1 | Purchase Date 1 | Item ID 1 | 1 |
| Consumer ID 1 | Purchase Date 1 | Item ID 2 | 1 |
| Consumer ID 1 | Purchase Date 1 | Item ID 3 | 1 |
| Consumer ID 1 | Purchase Date 2 | Item ID 1 | 1 |
| Consumer ID 1 | Purchase Date 3 | Item ID 1 | 1 |
| Consumer ID 1 | Purchase Date 4 | Item ID 1 | 1 |
| Consumer ID 1 | Purchase Date 5 | Item ID 1 | 1 |

600

DATES SPECIFIC ITEMS PURCHASED

| Cereal 1 (C1)<br>(CHEERIOS) | Cereal 2 (C2)<br>(RAISIN BRAN) | Diapers (D)<br>(PAMPERS) | Paper Towels (PT)<br>(BRAWNY) |
|---|---|---|---|
| May 1 | May 1 | May 1 | May 1 |
| May 8 |  | May 8 |  |
| May 15 | May 15 |  |  |
| May 22 |  | May 22 |  |
| May 29 | May 29 |  |  |
| June 5 |  |  | June 5 |

```
| May 1     May 8     May 15    May 22    May 29    June 5
|------------------------------------------------------------
| C1        C1        C1        C1        C1        C1
| C2                  C2                  C2
| D         D                   D
| PT                                                PT
```

PURCHASE INTERVALS

| Cereal 1<br>(CHEERIOS) | Cereal 2<br>(RAISIN BRAN) | Diapers<br>(PAMPERS) | Paper Towels<br>(BRAWNY) |
|---|---|---|---|
| 7 days | 14 days | 14 days | 30 days |

FIG. 6C

SEGREGATED ELECTRONIC SHOPPING LISTS FOR RECURRING ITEM PURCHASES

CROSS REFERENCE TO RELATED APPLICATION

This application is related to U.S. application Ser. No. 12/846,701, filed on Jul. 29, 2010, entitled "METHODS, SYSTEMS AND COMPUTER PROGRAM PRODUCTS FOR NOTIFYING CONSUMERS OF RECURRING PURCHASES," the contents of which are incorporated herein by reference.

BACKGROUND

Consumers purchase various items, goods and services such as groceries and other consumables such as cereal, meat, milk and baby formula, toiletries, personal hygiene supplies such as toothpaste, floss, mouthwash, etc. These items may be consumed and purchased weekly, every other week, once a month, and at other times depending on the quantity of items purchased each time and how quickly they are consumed. The rate at which items are consumed and how often they must be purchased again may be affected by various factors such as the number of people in a consumer's family, consumer preferences and circumstances. These factors may change over time as people join a family, preferences and consumption change, and new products become available.

Given the nature of consumable items, they are used or needed at different rates and at different times. Consumers may or may not know how much of a particular item remains and whether it is necessary to purchase the item again. Further, consumers often purchase different items from different stores for various reasons including item availability and selection, merchant loyalty, location and convenience, and prices charged by different merchants. For example, a consumer may purchase certain food items from a traditional grocery store such as SAFEWAY, certain food items from a specialty, bulk or farmers-market style grocery store such as WHOLE FOODS, certain items, such as bulk consumables, from a warehouse club store such as COSTCO, and other items from big box or superstore such as TARGET. Further, consumers may purchase certain items on-line from AMAZON or a merchant website.

In order to assess their needs, consumers may survey their needs by looking in their pantry, refrigerator, bathrooms, etc. to determine which items need to be purchased or replaced, and then make a shopping list in the form of a written note on a piece of paper or on a POST-IT note, which the consumer takes when shopping to remind the consumer which items to purchase. These types of shopping lists may not be updated with other items that are identified by the consumer at a later time.

Thus, consumers may forget their shopping lists or utilize an incomplete shopping list such that they do not know or forget which items are necessary, thereby resulting in the consumer forgoing such items until the next shopping trip, requiring the consumer to go out again to one or more stores to purchase forgotten items, purchase items from another merchant with less desirable item selection, fail to take advantage of opportunities to make purchases towards a rewards or points program offered by a particular merchant, and/or pay or travel more as a result of purchasing an item from a different merchant rather than from the merchant at which the consumer normally shops. These inconveniences and financial and time losses are due, in part, to consumers relying on their memories and ad-hoc shopping lists.

SUMMARY

One embodiment is directed to a computer-implemented method for generating customized shopping lists for a consumer. The method comprises utilizing or executing a purchase interval program to determine respective purchase intervals of a plurality of respective items purchased by the consumer from respective merchants with a purchase interval program executing on or accessed by a computer. Respective purchase intervals are based at least in part upon respective item-level electronic transaction data representing prior purchases of respective items by the consumer. The purchase interval program is also utilized or executed to determine an estimated date (e.g., a particular date or a time from a certain date) when the consumer will purchase respective items again based at least in part upon respective purchase intervals with the purchase interval program. The method further comprises utilizing or executing a shopping list program to generate a plurality of lists for a particular estimated date comprising respective items to be purchased by the consumer from different merchants based at least in part upon prior consumer purchases from different merchants.

A further embodiment is directed to a system for generating customized shopping lists for a consumer and comprises a computer, a purchase interval program and a shopping list program. The computer is operably coupled to or in communication with a source of item-level transaction data through a first network and operably coupled to or in communication with a computing device of a consumer through a second network. The purchase interval program is configured to execute on or is accessible by the intermediate computer to determine respective purchase intervals of a plurality of respective items purchased by the consumer from respective merchants. Respective purchase intervals are based at least in part upon respective item-level electronic transaction data of recurring purchases of respective items. The purchase interval program is further configured to determine respective estimated dates when consumer will purchase respective items again based at least in part upon respective purchase intervals. The shopping list program executes on or is accessible by the intermediate computer and configured to generate a plurality of lists for a particular estimated date. The lists comprise respective items to be purchased by the consumer from different merchants based at least in part upon prior consumer purchases from different merchants.

Yet another embodiment is directed to a computer program product comprising a non-transitory computer readable storage medium embodying one or more instructions or programs executable by a computer to perform a process for generating customized shopping lists for a consumer. The process comprises determining respective purchase intervals of a plurality of respective items purchased by the consumer from respective merchants, the respective purchase intervals being based at least in part upon respective item-level electronic transaction data representing prior purchases of respective items by the consumer, and determining respective estimated dates when the consumer will purchase respective items again based at least in part upon respective purchase intervals with the purchase interval program. The process further comprises generating a plurality of lists for a particular estimated date comprising respective items to be purchased by the consumer from different merchants based at least in part upon prior consumer purchases from different merchants.

Thus, with embodiments, the same or a single person or party can implement, utilize or perform computer-implemented methods, systems and computer program products to analyze consumer item-level transaction data generated by consumer spending and generate segregated electronic shopping lists based at least in part upon analyzed data.

In a single or multiple embodiments, item-level electronic transaction data, such as Level III data, is received at the intermediate computer from one or more of a computer of a financial institution at which the consumer has an account and an electronic payment device of a merchant and processed or analyzed by the purchase interval program to identify repeat item purchases, purchase intervals thereof, and estimated dates when the consumer will need to purchase the item again. One or more outputs generated by the purchase interval program are utilized by a shopping list program, which generates a plurality of shopping lists. The shopping lists are segregated, separated or divided based on pre-determined criteria such as by merchant, by groups of merchants or merchant type, or by groups of items or item category. In this manner, a consumer is provided with multiple shopping lists listing the items needed and in a more structured manner to convey which items are to be purchased from which merchants.

In one embodiment, shopping lists are segregated by a specific merchant or merchant name such that each list identifies respective items to be purchased from respective different merchants from whom respective items were previously purchased by the consumer. For example, a shopping list program may be configured to generate a first list including one or multiple items to be purchased from a first merchant and a second list including one or multiple items to be purchased from a second merchant. Merchant-segregated lists may be structured such that each item on each list was previously purchased by the consumer from respective merchants.

In a single or multiple embodiments, shopping lists segregated by merchant may be for merchants that are the same type of merchants or different types of merchants. According to one embodiment, lists are generated for merchants that are the same type. For example, all of the merchants can be grocery stores (e.g., SAFEWAY, RALPHS, VON'S, JEWEL, DOMINICKS, etc.), all of the merchants can be warehouse club stores that require memberships before a consumer can purchase items from the store (e.g., COSTCO and SAM'S CLUB), all of the merchants can be big box or super stores (e.g. TARGET and WAL-MART), or all of the merchants can be on-line merchants (e.g., AMAZON and E-BAY).

In a single or multiple embodiments, merchant-segregated shopping lists may be for different types of merchants. For example, one shopping list may be generated for a grocery store such as SAFEWAY, and another shopping list may be generated for a warehouse club store such as COSTCO. As another example, one shopping list may be generated for a grocery store such as SAFEWAY, and another shopping list may be generated for a big box store such as TARGET.

In a single or multiple embodiments, different shopping lists are generated based on being segregated by groups of merchants rather than based on individual merchants. For example, one shopping list may identify certain items to be purchased from a grocery store of a group of grocery stores such as SAFEWAY, RALPHS, ALBERTSONS and VON'S, whereas another shopping list may identify other items to be purchased from a merchant of a different group of merchants such as COSTCO and SAM'S CLUB. Shopping lists structured in this manner allow a consumer to know which items are to be purchased from one or more merchants of a group of merchants based at least in part upon prior consumer purchases from one or more or all of the merchants in a group.

In a single or multiple embodiments, multiple shopping lists are segregated, separated or divided by item category (e.g., food, cleaning supplies, toiletries, etc.) rather than based on merchant such that a list may include items that are "cleaning supplies," which a consumer may normally purchase from a warehouse club store such as COSTCO, whereas another list may include "food" items, the consumer normally purchases from a grocery store such as SAFEWAY. Shopping lists may also be FURTHER segregated, separated or divided to indicate specific merchants for groups of items.

BRIEF DESCRIPTION OF THE DRAWINGS

The foregoing and additional aspects of embodiments are described in further detail with reference to the accompanying drawings, wherein:

FIGS. 2A-C are diagrams of embodiments of systems for generating segregated shopping lists, wherein FIG. 2A illustrates a system in which an intermediate computer is in communication with a merchant computing device to receive item-level electronic transaction data from the merchant, FIG. 2B illustrates a system in which an intermediate computer receives or retrieves item-level transaction data using an intermediate source or financial management system that accesses user accounts, and FIG. 2C illustrates a system in which an intermediate computer receives or retrieves item-level electronic transaction data from a merchant and accounts at financial institutions;

FIGS. 6A-C illustrate examples of how a purchase interval program may be utilized to process electronic item-level transaction data for use in generating segregated shopping lists, wherein FIG. 6A is a table of item-level electronic transaction data showing prior purchase dates of various specific items, FIG. 6B, is a timeline of item purchases shown in FIG. 6A, and FIG. 6C is a table of purchase intervals for different items based upon data of FIGS. 6A-B;

FIGS. 10A-B illustrate one embodiment in which a shopping list program generates multiple shopping lists segregated by groups of merchants and that include respective groups of items to be purchased from one or more merchants of a group, wherein FIG. 10A illustrates a shopping list comprising a group of items and a group of grocery store merchants, and FIG. 10B illustrates a shopping list comprising a group of items and a group of warehouse club stores;

DETAILED DESCRIPTION OF ILLUSTRATED EMBODIMENTS

Embodiments relate to computer-implemented methods, systems and computer program products that may be implemented, utilized or performed by a single person or party analyze consumer item-level transaction data generated by consumer spending and generate customized, segregated or separated electronic shopping lists including items that have been previously purchased by consumers as identified based at least in part upon item-level electronic transaction data.

Figure 1:
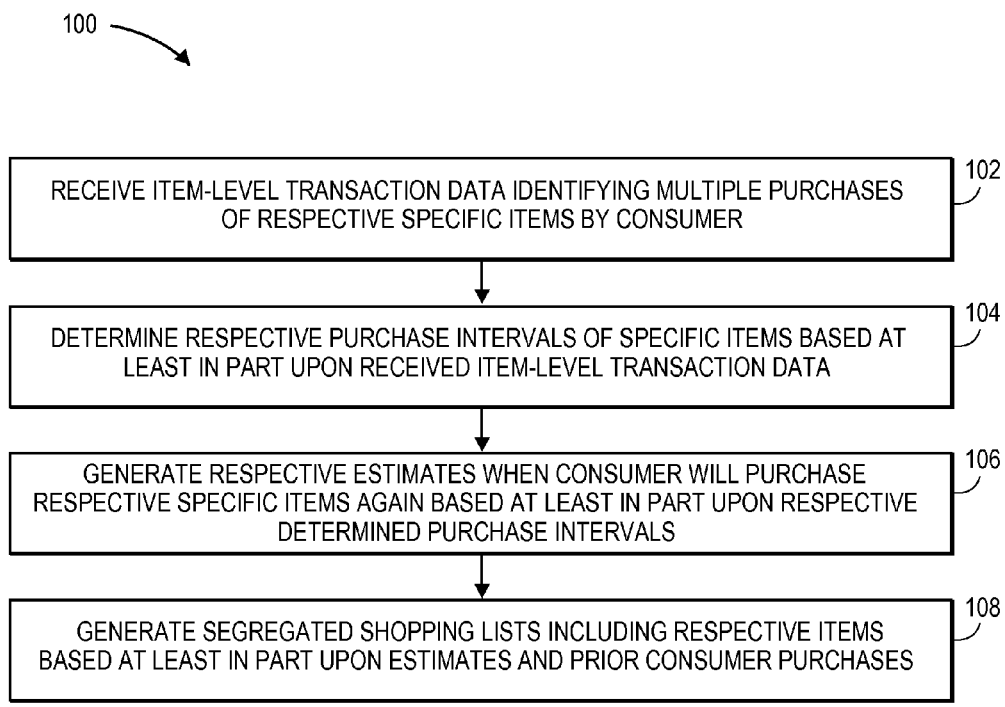
FIG. 1 is a flow chart of one embodiment of a method for generating segregated shopping lists based on one more of electronic item-level transaction data of prior purchases and estimates when specific items will be needed again.

Referring to FIG. 1, a computer-implemented method 100 that may be implemented, utilized or performed by a single person or party for generating segregated, electronic shopping lists according to on embodiment comprises, at 102, item-level transaction data being received from one or more sources at a host or intermediate computer. Item-level electronic transaction data identifies multiple purchases of a specific, particular item by consumer. At 104, the time between purchases of the specific item, or the purchase interval, is determined based at least in part upon received item-level electronic transaction data. At 106, an estimate, e.g., an estimated date of when consumer will purchase specific item again or an estimated time or number of days from a current date, is determined based at least in part upon the last purchase date of the item and the determined purchase interval. At 108, multiple shopping lists are generated and comprise respective items to be purchased by the consumer from different merchants. Items within shopping lists are identified based at least in part upon the respective estimated dates and prior purchases by the consumer from the different merchants. Shopping lists are segregated based upon pre-determined criteria, which may be selected by the consumer, and can be sent to the consumer in the form of one or more electronic messages to a computing or communication device of consumer such that consumer has segregated or separate shopping lists that can be utilized by the consumer to purchase specific items again.

For example, a purchase interval program may determine that a consumer purchases a particular cereal weekly from a particular merchant, but purchases diapers and paper towels weekly from a different merchant. The shopping list program generates multiple shopping lists segregated according to pre-determined criteria, e.g., according to merchant name, on a weekly or other basis or for a pre-determined or selected shopping date. Multiple, segregated shopping lists generated according to embodiments include a first shopping list with the cereal for a first merchant, and at least one other shopping list with diapers and paper towels for another merchant. Segregated shopping lists may be sent to the consumer in the form of an electronic message, and each shopping list may include one or multiple items that may need to be purchased again. If the consumer does not need the identified item, the item in the shopping list can be ignored, and the purchase interval program can adjust for any changes in consumption behavior. Embodiments and aspects thereof are described in further detail with reference to FIGS. 2A-15.

Figure 2A:
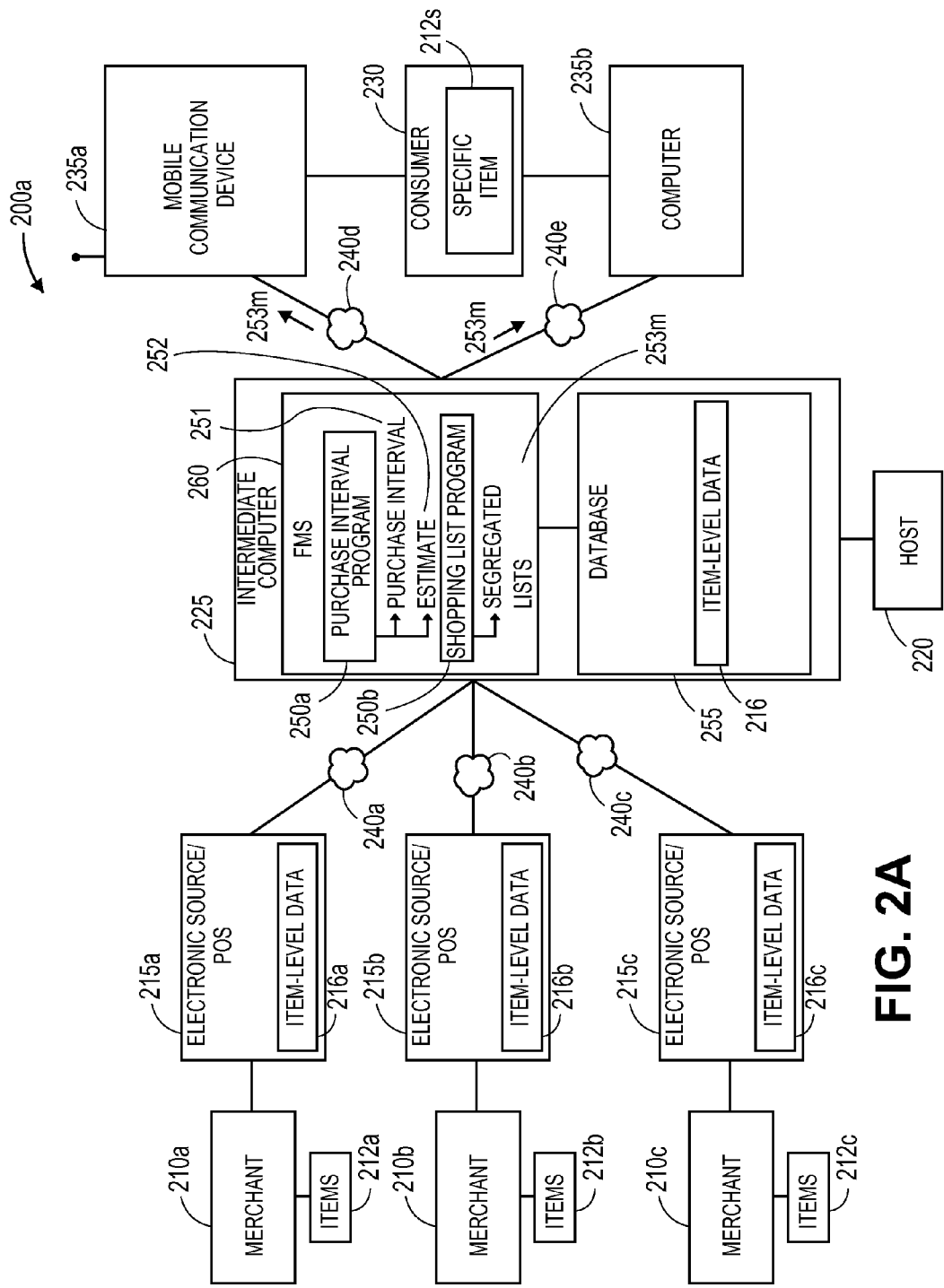

Referring to FIG. 2A, a system 200a (generally, system 200) constructed according to one embodiment for generating multiple shopping lists 253m that are segregated or divided according to embodiments ("m" identifying "multiple" shopping lists) that identify recurring item purchases comprises or may involve merchants 210a-c (generally, merchants 210) who offer various items, goods or services 212a-c (generally, "items" 212) for sale, a host 220 who collects item-level electronic transaction data 216 from merchants 210 and other originators of such data 216, and a consumer 230 who purchases a particular or specific item 212s ("s" referring to "specific" item) multiple times from one or more merchants 210.

FIG. 2A illustrates multiple merchants 210 that utilize respective electronic or computing devices or sources 215a-c (generally, electronic source 215) of item-level electronic transaction data 216a-c (generally, item-level electronic transaction data 216). While FIG. 2A illustrates three merchants 210, embodiments may involve other numbers of merchants 210 and may involve different or the same merchants 210 (e.g., different merchant stores or the same merchant stores at different locations). Electronic source 215 may be an electronic payment device such as a Point of Sale (POS) payment terminal, a cash register, a computer and a scanner system utilized by merchant 210. Item-level electronic transaction data 216 is generated by electronic source 215 and represents purchases of specific item 212s by consumer 230.

As defined in this specification, item-level electronic transaction data 216 identifies a specific, particular item 212s purchased by consumer 230 (e.g., a particular type or brand of cereal such as CHEERIOS cereal or a particular type or brand of diapers such as PAMPERS diapers), and may also include other item details such as size, quantity count, etc. For example, item-level electronic transaction data 216 that specifically identifies item 212s may include name or brand, description, product number, product code, symbol and other identifications or item data. One example of item-level electronic transaction data 216 that may be used for this purpose is Level III data such as item quantity, item codes, descriptions and full line item details of items purchased by consumer 230.

Electronic sources 215 such as POS payment terminals are operably coupled to or in communication with intermediate computer 225 managed by host 220, an example of which is Intuit Inc. or another host 220 that collects electronic transaction or receipt data and that may, in certain embodiments, be the single person or party that implements, utilizes or performs method and system embodiments. Host or intermediate computer 225 is operably coupled to a consumer device such as a mobile communication device 235a such as a cellular telephone, Smartphone or other mobile device capable of cellular or wireless communications, or a computer 235b such as a desktop or laptop home or office computer or tablet computing device capable of communicating with host computer 225 wirelessly or through a wire connection. For ease of explanation, reference is made generally to computing or communication device 235 of consumer 230.

Electronic sources 215a-c are operably coupled to or in communication with intermediate computer 225 through respective networks 240a-c, and intermediate computer 225 is operably coupled to or in communication with one or more of consumer computing devices 235a,b through respective networks 240d-e. Examples of networks 240a-e (generally, 240) and other networks discussed herein that may be utilized for communications between system 200 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 240 generally, but various networks, combinations of networks and communication systems, methods and protocols may be utilized.

Intermediate or host computer 225 includes or accesses a purchase interval program 250a and a database 255 that are cooperatively operable to aggregate and store item-level electronic transaction data 216 received from electronic sources 215. In a single or multiple embodiments, purchase interval program 250a is a stand alone program executing on or accessible by host computer 225. In other embodiments, the purchase interval program 250a is a component or module of a financial management system 260 ("FMS" in Figures), examples of which include QUICKRECEIPTS, QUICKEN, FINANCEWORKS, MINT, MICROSOFT Money, etc.), which is hosted or accessible by host computer 225. QUICKRECEIPTS, QUICKEN, FINANCEWORKS and MINT are registered trademarks of Intuit Inc.

Financial management systems 260 configured for use in embodiments are managed by hosts 220 with whom participating merchants 210 have agreed to provide item level-receipt data 216 associated with a particular consumer 230, e.g., using a membership card, club card as in QUICKRECEIPTS or other identifying information, or by the consumer 230 registering a credit card with the host 220 such that when item-level receipt data 216 is received at intermediate computer 225, financial management system 260 can allocate the data to consumer 230. Further aspects examples of a financial management system 260 that collects transaction or receipt data from merchants 210 is described in http://financeworks.com, and U.S. application Ser. No. 12/609,922, the contents of which are incorporated herein by reference as though set forth in full.

One embodiment of purchase interval program 254a that may be utilized in embodiments receives or accesses item-level electronic transaction data 216 from electronic sources 215 or collected and stored in database 255. Purchase interval program 254a comprises instructions which, when executed, analyze item-level electronic transaction data 216 to determine purchase interval 251 for specific item 212s, or the time between repeat purchases of a specific item 212s.

Host computer 225 may also include or access a shopping list program 254b operates with purchase interval program 254a and database 255 as necessary to divide or segregate items identified by purchase interval program 254a into multiple shopping lists 253m. Shopping list program 254b may be a stand alone program executing on or accessible by host computer 225. In other embodiments, purchase interval program 254b is a component or module of financial management system 260.

One embodiment of a shopping list program 254b that may be utilized in embodiments receives or accesses data utilized by or output by purchase interval program 254a and/or item-level electronic transaction data 216 stored in database 255 and comprises instructions which, when executed, determine which items 212 were estimated by purchase interval program 254a to be needed or purchased again within a pre-determined time or by a certain date, generates multiple shopping lists 253m segregated according to pre-determined criteria, and establishes a communication with consumer computing device 235 to transmit or display the generated, segregated shopping lists 253m to consumer 230.

Figure 2B:
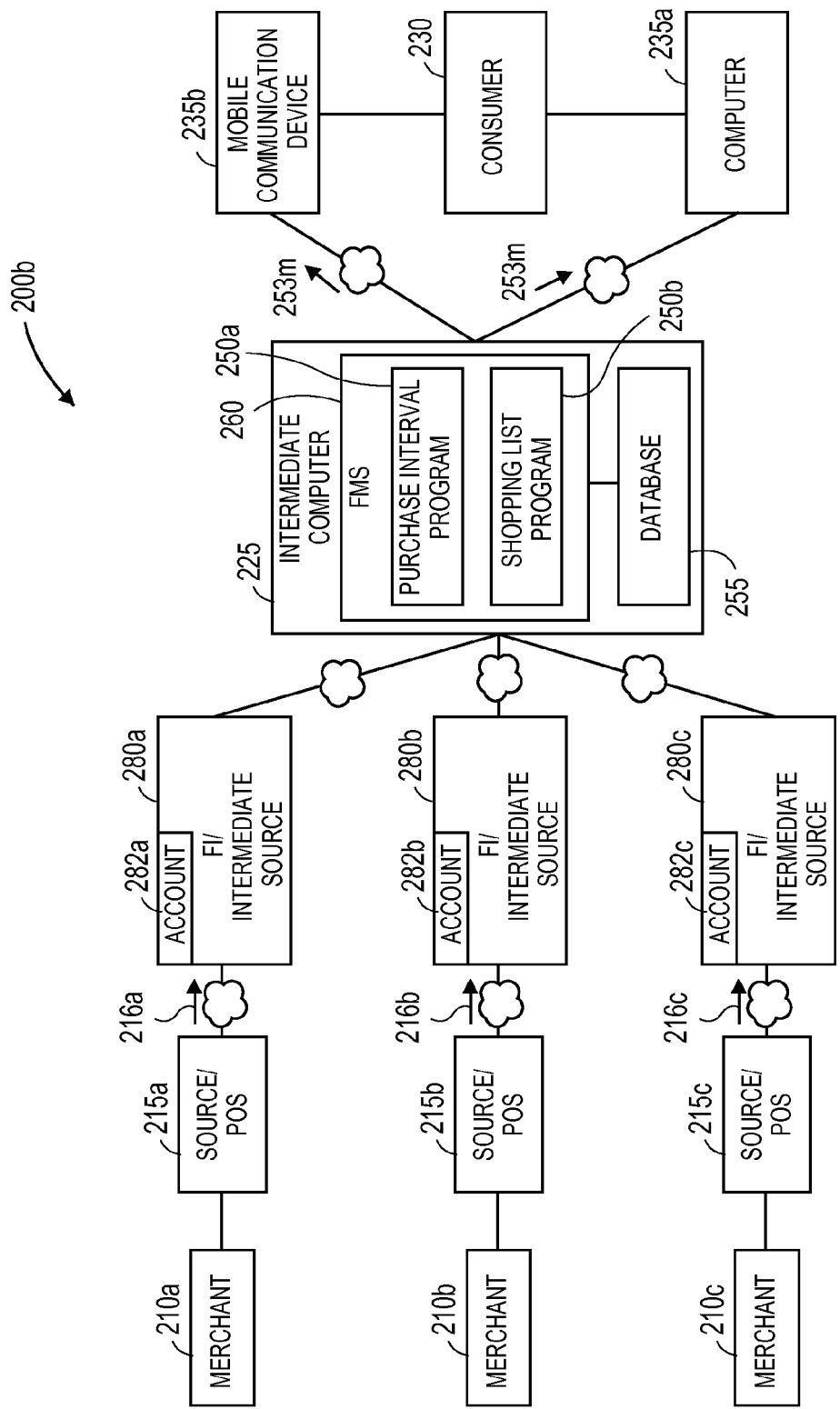

In another embodiment, referring to FIG. 2B, in a system 200b constructed according to another embodiment, purchase interval program 254a may be a stand-alone program or a program or module of a financial management system 260 that is operably coupled to or in communication with computers of financial institutions 280a-c (generally, 280, and shown as "FI" in FIG. 2B). Consumer 230 has respective accounts 282a-c (generally, account 282) including respective item-level transaction data 216a-c at respective financial institutions 280a-c. Thus, rather than receiving item-level transaction data 216 from an electronic payment device 215 of a merchant 210, such data is received from an account 282 at a FI 280 such as a bank, credit card company or other financial institution 280 at which consumer 230 has an account 282 such as a checking, savings or credit card account including item-level electronic transaction data 216. Financial management systems 260 that may be utilized for this purpose include, for example, desktop or on-line financial management system.

Figure 2C:
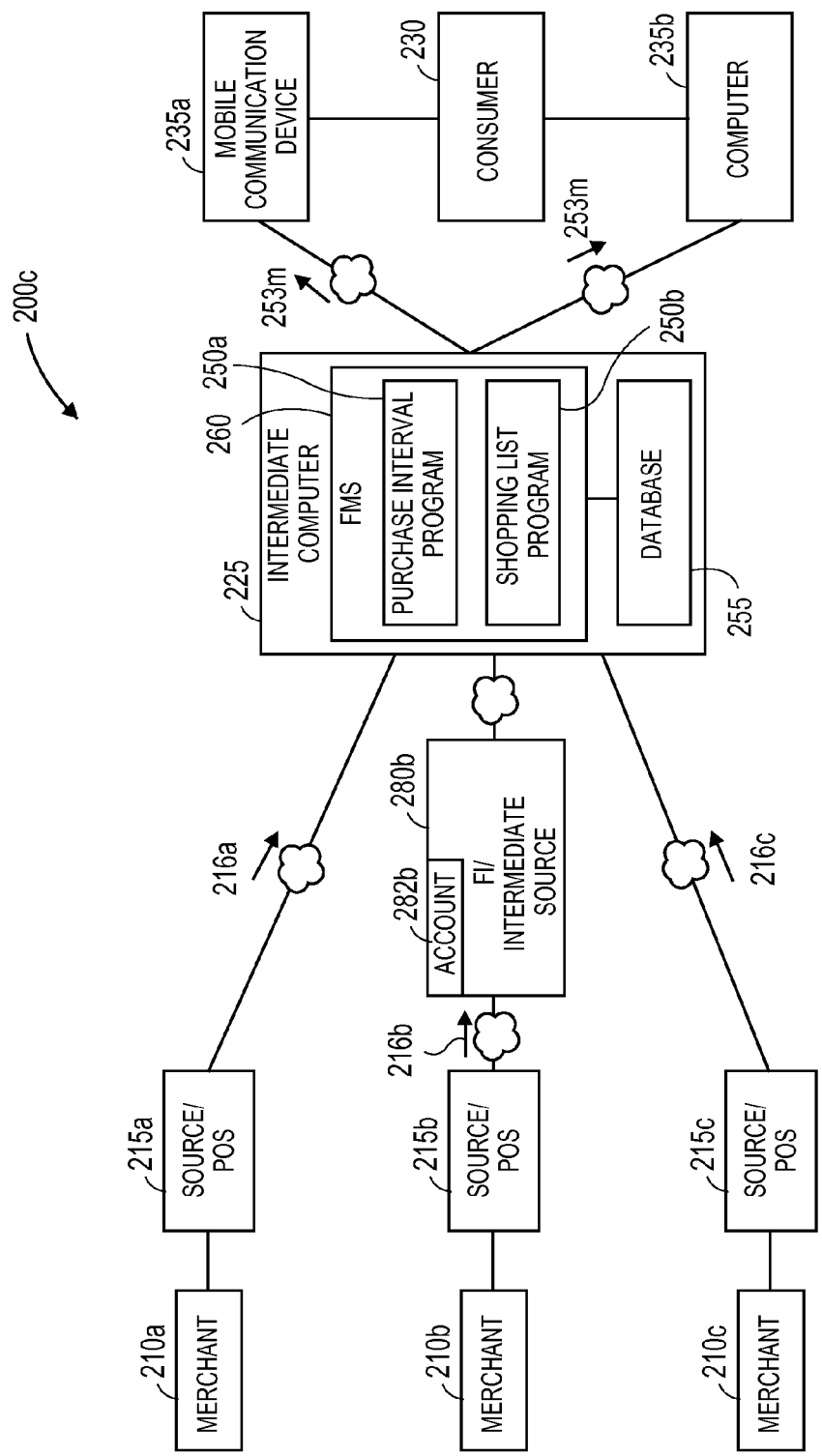

FIG. 2C further illustrates another system 200c configuration in which item-level electronic transaction data 216 is received both from an originator of the data (as shown in FIG. 2A) and through an intermediate computer or source, e.g., using a FMS 260 that is configured to receive item-level transaction data 216 from merchants 210 and from accounts 282 at FIs 280.

Thus, the term financial management system 260 as described above with reference to FIGS. 2A-C is defined to include, any computing system implemented, on-line or web-based, system, package, program, module, or application that gathers financial data, has the capability to receive or retrieve financial data including item-level electronic transaction data 216, analyze and categorize at least part of the financial data into various reports or displays that are provided to consumer 230, and provides consumer 230 with the capability to conduct, and/or monitor, financial transactions. Further aspects of financial management systems 260 and capabilities thereof are described in U.S. application Ser. No. 12/846,701, previously incorporated by reference.

Figure 3:
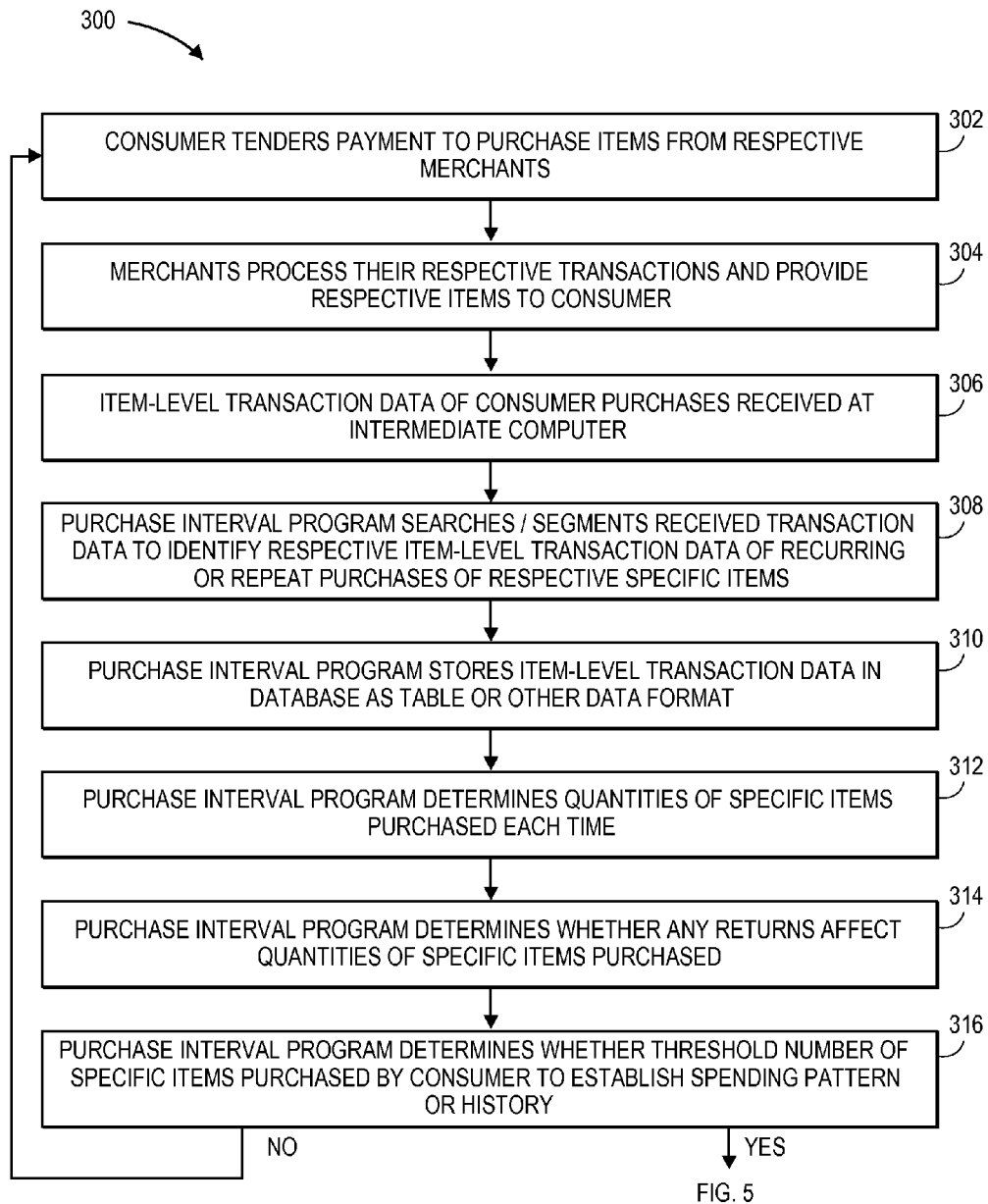
FIG. 3 is a flow chart of one embodiment of a method for processing item-level electronic transaction data for use in generating segregated shopping lists.

Referring to FIG. 3, one embodiment of a method 300 for determining purchase intervals 251 and for generating multiple, segregated shopping lists 253m that may be implemented with system 200 embodiments described above and other system configurations comprises, at 302, consumer 230 tendering payment to purchase one or more items 212 from merchant(s) 210. Payment may be made using, for example, a payment or transaction card (e.g., credit card, debit card), check, cash and other forms of payment.

Embodiments may apply to purchases of various types of items 212 by various consumers 230 including individual consumers who purchase consumable goods such as groceries, healthcare or personal hygiene items, clothing, books, etc. and/or services such as dog groomer, house cleaning, car washes, dry cleaning, automobile maintenance, etc., corporate consumer and government consumers (e.g., for purchases of consumables such as office supplies, parts, materials, and other recurring purchases and services). For ease of explanation, reference is made generally to an individual consumer 230 purchasing items 212 from merchant 210, but it should be understood that embodiments may be applied to analyze repeat purchases of various items 212 purchased by various consumers 230 including goods and/or services, and that a consumer 230 may, for example, be an individual consumer, a corporate consumer or a government consumer.

Certain embodiments may involve various types, classifications or categories of merchants which, as described in further detail below, may serve as pre-determined segregation criteria to generate multiple shopping lists 253m. For example, one type of merchant 210 may be "grocery store" examples of which include VONS, SAFEWAY, RALPHS, ALBERTSONS, STATER BROTHERS, JEWEL and DOMINICKS and smaller specialty or niche retail or grocery stores such as WHOLE FOODS, TRADER JOES, SPROUTS, HENRY'S. Another type of merchant 210 is "big box store," "superstore," "supercenter," "megastore" or "discount store" (generally, "big box store"), examples of which include TARGET and WAL-MART. Yet another type of merchant 210 type is "club membership store," examples of which include COSTCO and SAM'S CLUB and other club membership stores that allow consumers to shop at their club stores if consumers are members or guests of members who are often required to pay an annual membership fee. Another example of a merchant 210 "type" is "on-line merchant," examples of which include AMAZON, E-BAY and websites of merchants 210. While embodiments are described with reference to examples of types or categories of merchants 210, it will be understood that there may be other merchant 210 types and sub-types, and that merchants 210 noted above may be of a different type or category for purposes of segregation or separation according to embodiments.

Continuing with FIG. 3, at 304, merchant 210 processes the transaction and provides purchased item(s) 212 including a specific item 212s to be tracked to consumer 230. If consumer 230 pays with a payment card, the payment card is swiped through POS payment terminal 215, which generates item-level electronic transaction or receipt data 216 for the purchase. A paper or electronic mail receipt identifying the item 212 purchased is also is provided to consumer 230. Merchant 210 may also manually enter item-level electronic transaction data 216 into POS payment terminal 215 (e.g., if consumer 230 pays cash). Item-level electronic transaction data 216 generated or entered by merchant 210 may be Level III data.

Item-level electronic transaction data 216 is stored electronically by merchant 210, and 302-304 are repeated at various times such that consumer 230 purchased the same item 212s multiple times. This may occur over a matter of days, weeks, months, years or other durations of time, with the result that consumer 230 purchases the same, specific item 212s multiple times.

At 306, item-level electronic receipt data 216 is transmitted from POS payment terminal 215 or another associated merchant computer or source to intermediate computer 225. Intermediate computer 225, e.g., using a financial management system 260 such as QUICKRECEIPTS, receives and aggregates item-level electronic receipt data 216 including data related to multiple purchases of the same item 212s by consumer 230. Embodiments may also involve item-level electronic receipt data 216 that is received at the intermediate computer 225 from consumer 230 or generated based on data provided by consumer 230. For example, consumer 230 may have received an e-mail confirmation or receipt from merchant 210 identifying the particular item purchased, and that e-mail can be forwarded to intermediate computer 225 and analyzed to identify item-level electronic transaction data 216. Further, consumer 230 may photograph or scan the paper receipt and send it to intermediate computer 225. Consumer 230 may also send the paper receipt to host 220, which photographs or scans the receipt to generate item-level electronic transaction data 216. For this purpose, Optical Character Recognition (OCR) and other text recognition methods may be utilized to read data of the paper receipt. For example, embodiments may involve sources of item-level or Level III data such as receipt repositories such as neatreceipts.com, which provide services for scanning receipts, performing OCR processing, and storing receipts.

In the embodiments described above, the system configuration shown involves intermediate computer 225 and purchase interval program 254a or financial management system 260 receiving item-level electronic transaction data 216 from an originator of the data, e.g., from POS payment terminals 215a-c of subscribing or member merchants 210a-c. Other embodiments may involve intermediate computer 225 or purchase interval program 254a receiving or retrieving item-level electronic transaction data 216 from another source.

Thus, in a single or multiple embodiments, item-level electronic transaction data 216, such as Level III data, identifies purchases of specific, particular items 212s by item name, description, serial number, code, symbol or other specific item identifier and may identify a particular brand or provider of cereal, diapers, and various services. Item-level electronic transaction data 216 may be received from one or multiple sources, which may be the same type or different types of sources. For example, in various embodiments, the sources are different stores of the same merchant 210, different merchants 210, a financial management system 260 or program that collects item-level electronic transaction data from participating merchants and/or that accesses consumer accounts to receive or retrieve such data. Item-level electronic transaction data 216 may also be provided by or retrieved from a merchant 210 and a financial institution 280, a merchant 210 and a financial management system 260, a financial management system 260 and a financial institution 280, and other combinations of sources of item-level electronic transaction data 216.

Thus, as an example, item-level electronic transaction data 216 is received from a first source such as a first merchant 210 having a first electronic payment device 215 and from whom consumer 230 purchased an item 212s a first time, and from a second source such as a second merchant 210 having a second electronic payment device 215 and from whom consumer 230 purchased the same item 212s a second time. This data may be collected by a financial management system 260 that is operably coupled to or in communication with electronic payment devices 215 of merchants 210.

Referring again to FIGS. 2A and 3, at 308, purchase interval program 254a searches or segments transaction data 216 received at or retrieved or generated by intermediate computer 225 to identify recurring purchases of a specific item 212s. For this purpose, purchase interval program 254a may search for specific item 212s identifiers such as name, description, product codes, etc. At 310, item-level electronic transaction data 216 of recurrent purchases of specific item 221s is stored in database 255 as a table or other data format and may be for one or multiple consumers 230.

Figure 4:
FIG. 4 illustrates an example of a table that may be generated by a purchase interval program to store item-level electronic transaction data for specific items.

For example, referring to FIG. 4, purchase interval program 254a may generate a table 400 including item-level electronic transaction data 216 for each consumer 230 that includes a column 402 for consumer identification (e.g., name, user name or registration number with the system), a column 404 for purchase date, a column 406 for item identification (such as item name, description, product code, etc.), and a column 408 for quantity of items purchased. In the illustrated example, some of the items are recurring purchases (four purchases by consumer 1 involve recurring purchases whereas purchases by other consumers do not). FIG. 4 illustrates that this consumer 230 purchased item 212s during five different shopping trips since one item was purchased during each shopping trip in this example.

Referring again to FIG. 3, at 312, purchase interval program 254a determines the quantity of specific items 212s purchased during a pre-determined time, e.g., items 212s purchased every week, every two weeks, every month, every two months, and other times, which accounts for consumer 230 purchasing one or multiple specific items 212s at a time. At 314, if necessary or as needed and if return data is available, purchase interval program 254a determines whether any returns of specific items 212 affect the quantity of specific items 212 purchased and consumed or to be consumed and that is to be used in determining a purchase interval 251.

At 316, in certain embodiments, purchase interval program 254a determines whether a minimum or threshold number of specific items 212s has been purchased or purchased within a certain time. This may be done to establish an acceptable spending history on the specific item 212s. For example, embodiments may be configured such that an acceptable spending history is established with three, four, five or other numbers of purchases of the same specific item 212s.

If purchase interval program 254a determines that there has not been the threshold or minimum number of purchases of the same item 212s, then the purchase interval program 254a waits for additional purchases and the method goes back to 302. If purchase interval program 254a determines that there have been a sufficient number of purchases of the same item 212, then the method 300 proceeds to FIG. 5.

Figure 5:
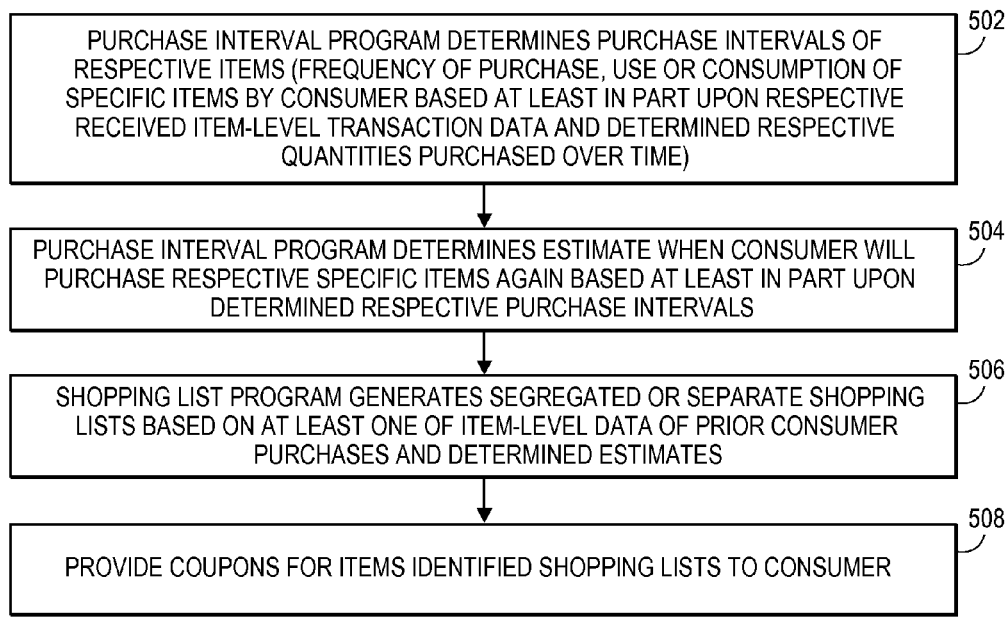
FIG. 5 is a flow chart of one embodiment of a method for processing item-level electronic transaction data to determine when items will be purchased again and to generate segregated shopping lists including those items.

Referring to FIG. 5, at 502, purchase interval program 254a determines or estimates purchase interval 251, which estimates the frequency of purchase or rate of consumption of specific item 212s by consumer 230. This determination is based at least in part upon received item-level electronic transaction data 216 and the determined quantity of specific items 212s purchased over a time.

For example, 502 may involve determining an average number of days between purchases of the specific item 212s, which indicates or approximates how quickly that item 212s is consumed and when that item 212s needs to be purchased again. Thus, purchase intervals 251 for different specific items 212s may vary since different specific items 212s are consumed at different rates.

At 504, purchase interval program 254a estimates when consumer 230 will purchase specific item 212s again based at least in part upon determined purchase interval 251. For example, purchase interval program 254a may indicate a particular estimated date 252 by which specific item 212s will be consumed or a number of days or weeks from a current date. The estimated date may also be a pre-determined or selected date, e.g., a weekend day when consumer 230 typically shops, and purchasing needs are made with respect to the estimated or pre-determined date. This estimated date 252 may be based upon the last date the specific item 212s was purchased and the determined purchased interval 251. These determinations are repeated such that purchase interval program 254a analyzes and generates a purchase interval 251 for each item 212s specifically identified by item-level transaction data 216, generates respective estimated dates 252 when consumer 230 will need to purchase those items 212s again. Purchase intervals 251 of different items 212s may be the same or different, and estimated dates 252 generated by purchase interval program 254a may be the same or different depending on purchase intervals 251 and the last time each item 212s was purchased.

FIGS. 6A-C illustrate a more detailed example of how purchase intervals 251 and estimated dates 252 may be determined. Referring to FIG. 6A, item-level electronic transaction data 216 received at host computer 225 may be searched and organized in the form of a table 600. In the illustrated embodiment, table 600 includes data related to an example involving weekly purchases from May 1 to June 5 of four specific items 212 by consumer 230: Cereal 1 (e.g. CHEERIOS), Cereal 2 (e.g., RAISIN BRAN), Diapers (e.g., PAMPERS) and Paper Towels (e.g., BRAWNY), as identified by item name, description, product code, etc. of the received item-level electronic transaction data 216. Data of each item 212s is provided in respective columns 602a-d of table 600. In this example, rows of table 600 include purchase dates of each item 212s spanning six weeks. Cereal 1 (C1) was purchased each week, Cereal 2 (C2) was purchased three of the six weeks (every other week), Diapers (D) were purchased three of the six weeks, and Paper Towels (PT) were purchased two of the six weeks. For ease of explanation of this example, it is assumed that consumer 230 purchased one of each item at each time. A timeline 610 further illustrating these weekly purchases is illustrated in FIG. 6B.

Purchase interval program 254a determines purchase interval 251 of each of the four specific items 212s based on historical item-level electronic transaction data 216. As shown in FIG. 6C, these determinations are summarized in a table 620 indicating that purchase interval 251a of Cereal 1 (CHEERIOS) is 7 days or one week, purchase interval 251b of Cereal 2 (RAISIN BRAN) is 14 days or two weeks, purchase interval 251c of Diapers (PAMPERS) is also 14 days or two weeks, and purchase interval 251d of Paper Towels (BRAWNY) is 21 days or three weeks. In the illustrated example, purchase intervals 251b,c of Cereal 2 (RAISIN BRAN) and Diapers (PAMPERS) are the same even though RAISIN BRAN and PAMPERS s were purchased at different times due to considering the average number of items 212s purchased over the same time.

Referring again to FIG. 5, at 506, and according to embodiments, shopping list program 254b generates segregated or separate shopping lists 253m. Segregated shopping lists 253m may be sent to consumer 230 in the form of an e-mail or SMS message to a mobile communication device 235a or computer 235b or displayed to consumer 230 in advance of or on an estimated date 252 or in response to consumer 230 request such that consumer 230 is prepared to purchase certain items 212a from one merchant 210a, and other items 212b from another merchant 210b.

Figure 7A:
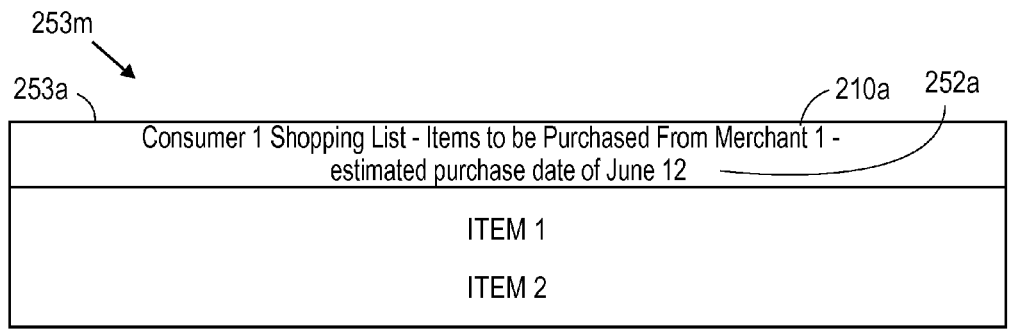
FIGS. 7A-C illustrate one embodiment in which a shopping list program generates multiple shopping lists segregated by merchant and including respective items identified based at least in part upon an output of a purchase interval program.
Figure 7B:
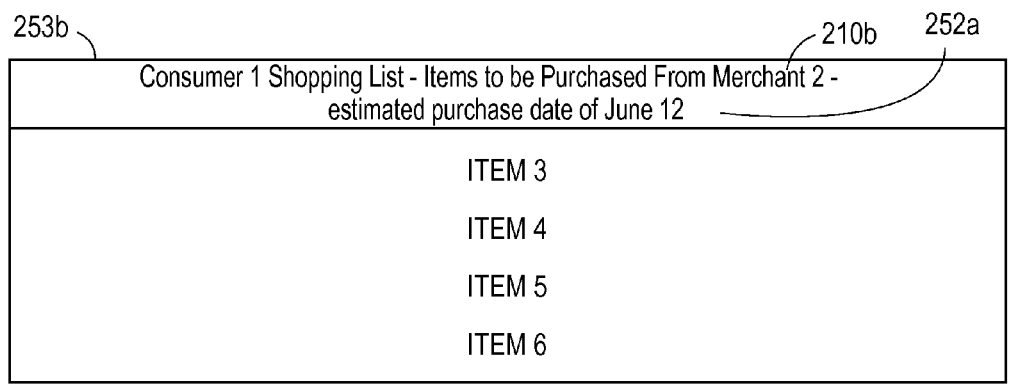
Figure 7C:
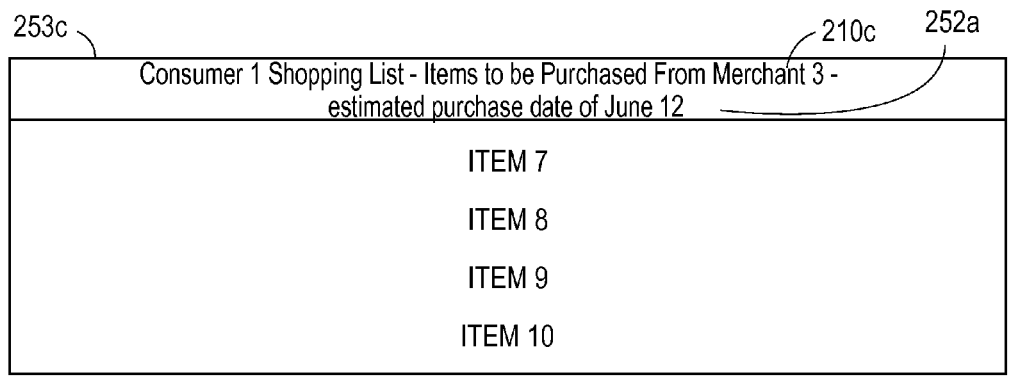

Referring to FIGS. 7A-C, according to one embodiment, rather than generating a single shopping list for an estimated date 252 including all items 212 identified by purchase interval program 254a for that estimated date 252, embodiments utilizing shopping list program 254b are operable to analyze recurring purchases of specific items 212s, merchants 210 from whom those purchases were made, and generate multiple shopping lists 253m that are segregated or separated according to pre-determined segregation criteria.

According to one embodiment, a shopping list 253 may list items for purchase on the estimated date 252 as shown in FIGS. 7A-C. According to another embodiment, a shopping list 253 also identifies the quantity of items to be purchased.

The quantity may be based at least in part upon the determined purchase interval and/or estimated date for which the shopping list is generated. For example, if it is determined that consumer 230 utilizes one box of cereal per week, a shopping list 253 generated for the following week would indicate "1" box of that cereal, whereas a shopping list generated for an estimated date 252 of two weeks may indicate "2" boxes of that cereal. It will be understood that a shopping list 253 may include various items and/or quantities determined utilizing data such as the determined purchase interval and/or estimated date, and for ease of explanation, reference is made to shopping lists 253 generally or shopping lists 253 that list items.

According to one embodiment, shopping list program 254b is operable to generate merchant-specific shopping lists 253 for each merchant 210 from whom recurring item 212 purchases have been made. Thus, in the embodiment generally illustrated in FIGS. 7A-C, shopping list program 254b generates multiple shopping lists 253m for a given estimated date 252a and based at least in part upon prior purchases of items 212 from various merchants 210. In the illustrated embodiment, for a given estimated date 252a (e.g. June 12), shopping list program 254b generates a first shopping list 253a with certain items 212 (e.g., ITEMS 1-2) to be purchased from a first merchant 210a, a second shopping list 253b identifying other items 212 (e.g., ITEMS 3-6) to be purchased from a second merchant 210b, and a third shopping list 253c identifying additional items 212 (e.g., ITEMS 7-10) to be purchased from a third merchant 210c. According to one embodiment, each shopping list 253a-c is specifically tailored to identify items 212 that were previously purchased by consumer 230 and from those respective merchants 210 such that first shopping list 253a includes ITEMS 1-2 that consumer 230 previously purchased from Merchant 1 210a, second shopping list 253b includes ITEMS 3-6 that consumer 230 previously purchased from Merchant 2 210b, and third shopping list 253c includes ITEMS 7-10 that consumer 230 previously purchased from Merchant 3 210c.

Figure 8A:
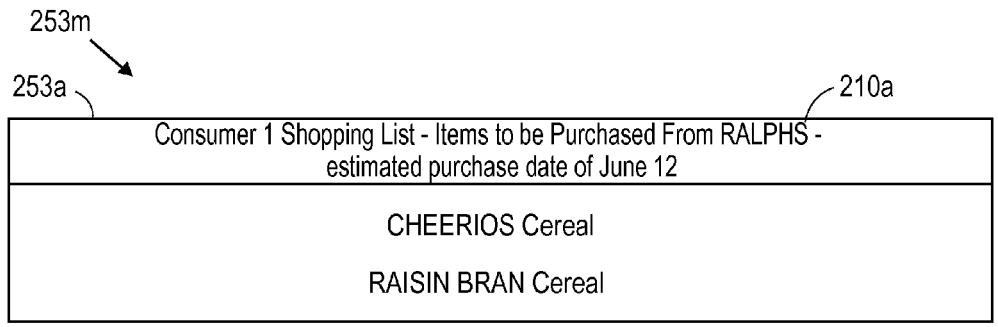
FIGS. 8A-C illustrate one example of how merchant segregated shopping lists shown in FIGS. 7A-C can be implemented by generating multiple shopping lists for the same type of merchants.
Figure 8B:
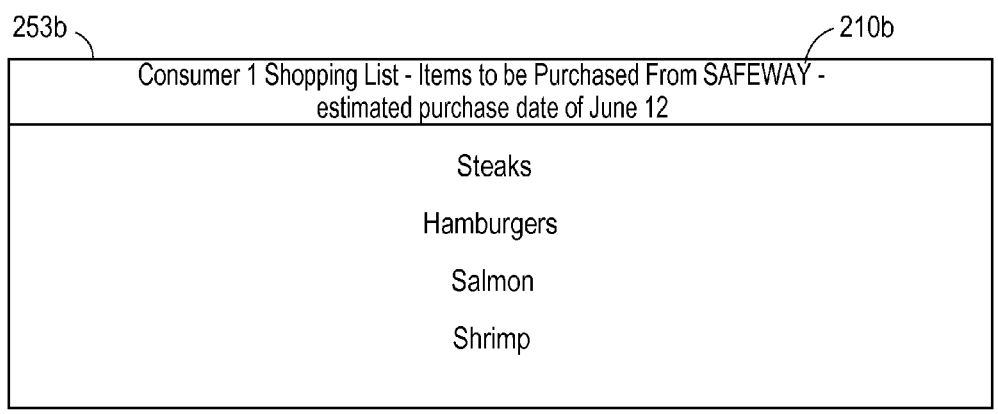
Figure 8C:
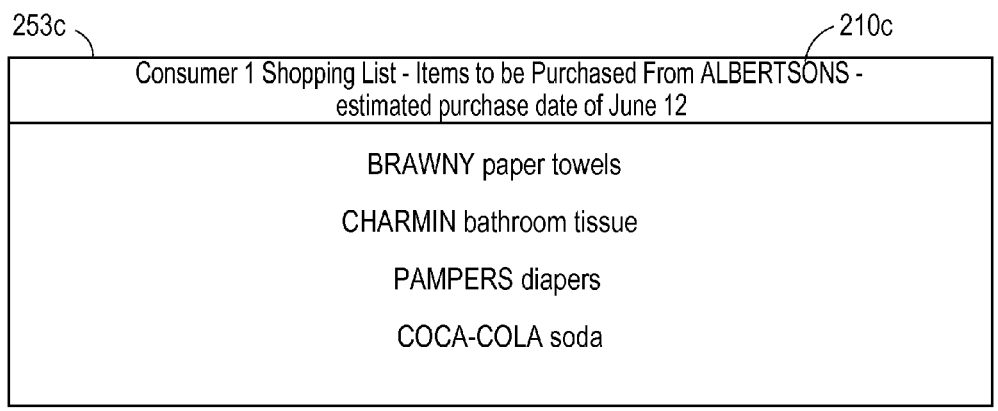

Referring to FIGS. 8A-C, one example of how embodiments may be implemented involves generation of multiple shopping lists 253m (e.g., three shopping lists 253a-c) for merchants 210 of the same type or category (e.g., merchant type "grocery store"). In the illustrated embodiment, first shopping list 253a is generated for items (CHEERIOS and RAISIN BRAN cereals) to be purchased from RALPHS grocery store 210a, second shopping list 253b is generated for meat and seafood items (steaks, hamburgers, salmon and shrimp) items to be purchased from SAFEWAY grocery store 210b, and third shopping list 253c is generated for items (BRAWNY paper towels, CHARMIN bathroom tissue, PAMPERS diapers, and COCA COLA soda)) to be purchased from an ALBERTSON'S grocery store 210c. Thus, shopping list program 254b is operable to generate multiple shopping lists 253m for different grocery stores at which consumer 230 has shopped in the past and bought respective items 212 identified in respective shopping lists 253a-c. There may be various reasons for consumer's prior shopping activities or preferences, e.g., consumer 230 may believe the quality of the meat and seafood is better at SAFEWAY than other grocery stores, or RALPHS may have better or more frequent sales on cereal. Further, while embodiments are described with reference to three examples of grocery store merchants 210, it will be understood that embodiments may involve other numbers of lists for other numbers of grocery stores including, for example, VONS, STATER BROTHERS, JEWEL, DOMINICKS, WHOLE FOODS, TRADER JOES, SPROUTS, HENRY'S, etc.

Figure 9A:
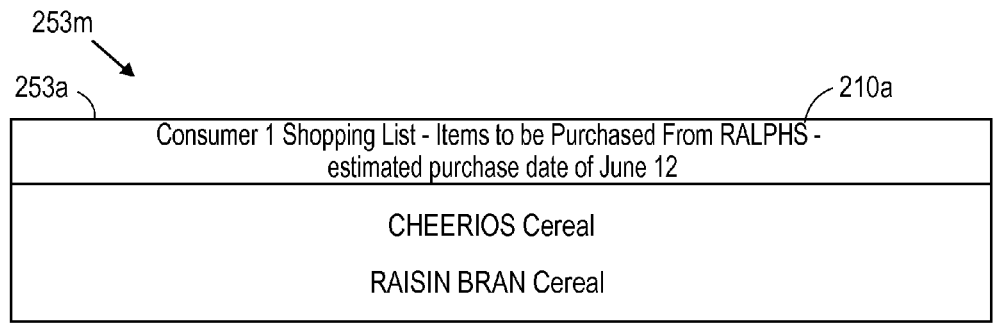
FIGS. 9A-C illustrate one example of embodiments directed to merchant segregated shopping lists shown in FIGS. 7A-C by generating multiple shopping lists for different types of merchants such as a grocery store and warehouse club store for a first estimated date.
Figure 9B:
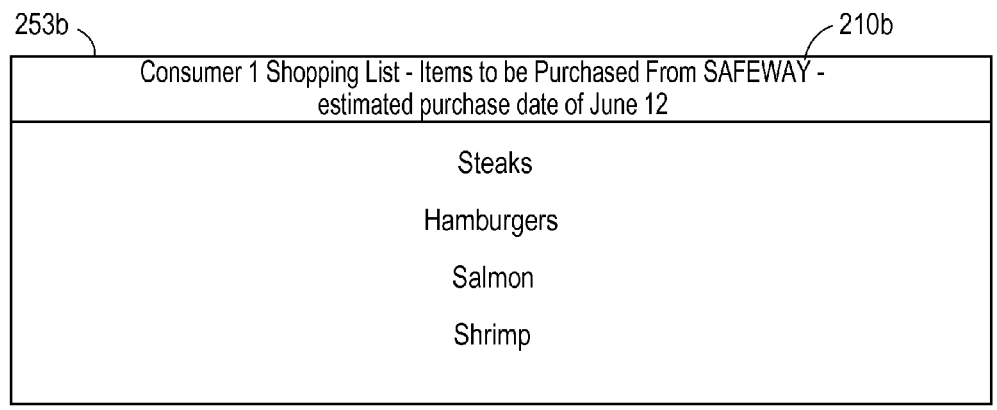
Figure 9C:
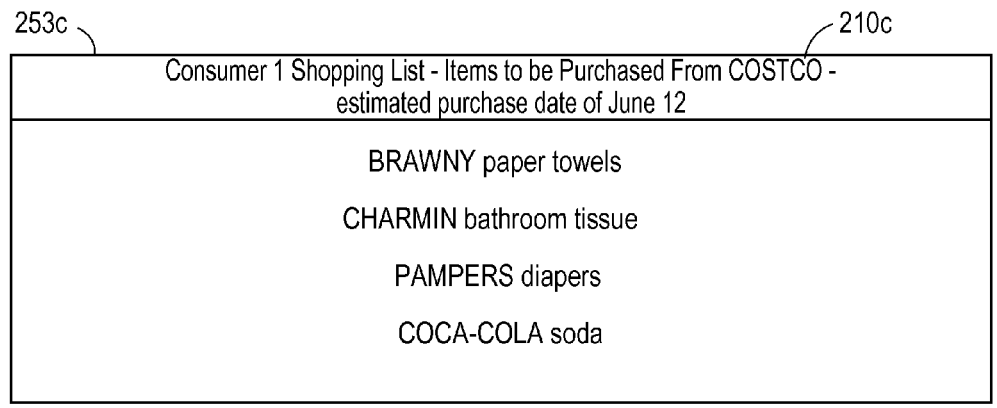

Referring to FIGS. 9A-C, another example of how embodiments may be implemented involves generation of multiple shopping lists 253m (e.g., three shopping lists 253a-c) for different types of merchants 210 rather than all of the shopping lists 253m being for the same type of merchant 210 as in FIGS. 8A-C. In the embodiment illustrated in FIGS. 9A-C, a first list 253a is generated for items (CHEERIOS and RAISIN BRAN cereals) to be purchased from a RALPHS grocery store 210a (as discussed above with reference to FIG. 8A), a second list 253b is generated for meat and seafood items (steaks, hamburgers, salmon and shrimp) items to be purchased from a SAFEWAY grocery store 210b (also as discussed above with reference to FIG. 8B), but the third list 253c is generated for items (BRAWNY paper towels, CHARMIN bathroom tissue, PAMPERS diapers, and COCA COLA soda)) to be purchased from a merchant 210c other than a grocery store. In the illustrated embodiment, third shopping list 253 is instead for purchases from a different type of merchant such as Costco (club membership store). Thus, certain embodiments are configured to generate multiple shopping lists 253m for different numbers and types of merchants 210. Further, FIGS. 8A-C illustrate how electronic item-level transaction data 116 can be used to generate multiple, segregated shopping lists that identify a specific item by name or brand (FIGS. 8A and 8C) or that specific items that are identified can be categorized such that a shopping list that is generated identifies categories or types of items (FIG. 8B) rather than identifying items by name or brand. While FIGS. 8A-C illustrate one embodiment in which meat and fish products are listed by category or type, it should be understood that other items may be categorized and included in a shopping list 253 in this manner.

While embodiments are described with reference to three merchants 253a, two of which are grocery stores and one of which is a club membership store, it should be understood that embodiments may involve other numbers of lists 253 for other numbers of grocery stores, other numbers of club membership stores, other numbers of big box stores or superstores, or other types of merchants 210 and combinations thereof. Moreover, while FIGS. 9A-C illustrate an example involving shopping lists 253 for two grocery stores and one club membership store such that there are certain merchants of the same type and at least one merchant of a different type, other embodiments may involve different numbers and combinations of different types of merchants 210 or each of the multiple lists 253m being for a different type of merchant 210. Thus, FIGS. 9A-C are provided as illustrative examples of how different embodiments may be implemented to generate segregated shopping lists 253m for the same type or different types of merchants 210.

Figure 9D:
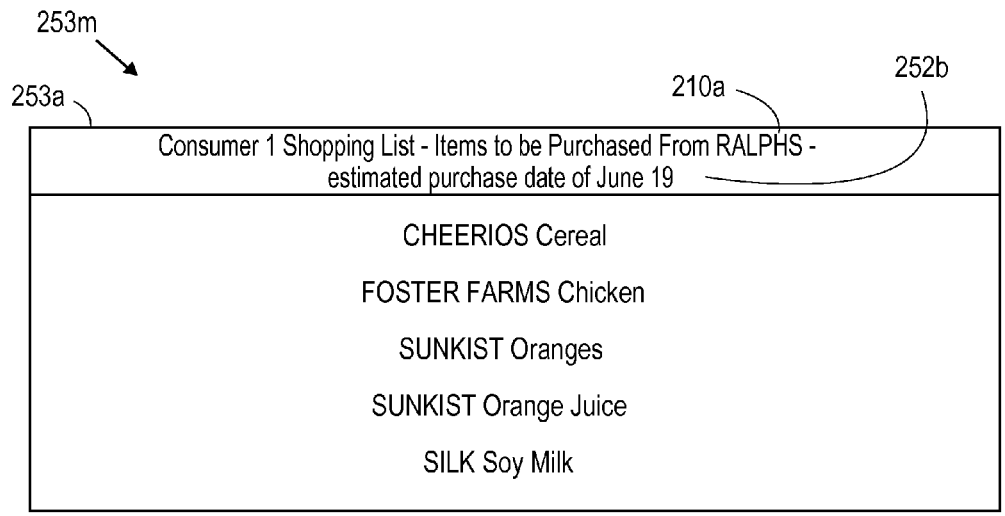
FIGS. 9D-E illustrate another example of generating multiple shopping lists for different types of merchants for a second estimated date.
Figure 9E:
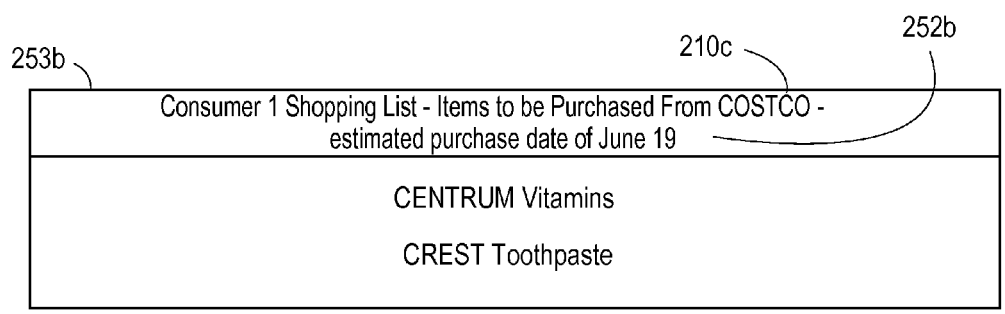

FIGS. 9D-E further illustrate how multiple, segregated shopping lists 253m generated according to embodiments are dynamic and change over time depending on purchase needs of the consumer 230. FIGS. 9A-C illustrate three shopping lists 253a-c for three merchants 210a-c, at least one of which is a different type relative to the others. FIGS. 9D-E illustrate how consumer 230 needs as determined by purchase interval program 254b change from week to week or other time period, and shopping lists 253m generated according to embodiments also change. For example, while it was determined that consumer 230 needed CHEERIOS cereal and SILK soymilk on a first estimated date 252a of June 12 from RALPHS, on estimated date 252b of June 19, it was determined by purchase interval program 254a that consumer 230 did not need RAISIN BRAN cereal but needed other items, and these different needs are reflected in different shopping lists 253. Thus, FIGS. 9A-E generally illustrate how embodiments may be utilize to generate multiple shopping lists 253m segregated on a merchant-specific basis, and how lists for each merchant 210 may be adjusted for different estimated or shopping dates.

Figure 10A:
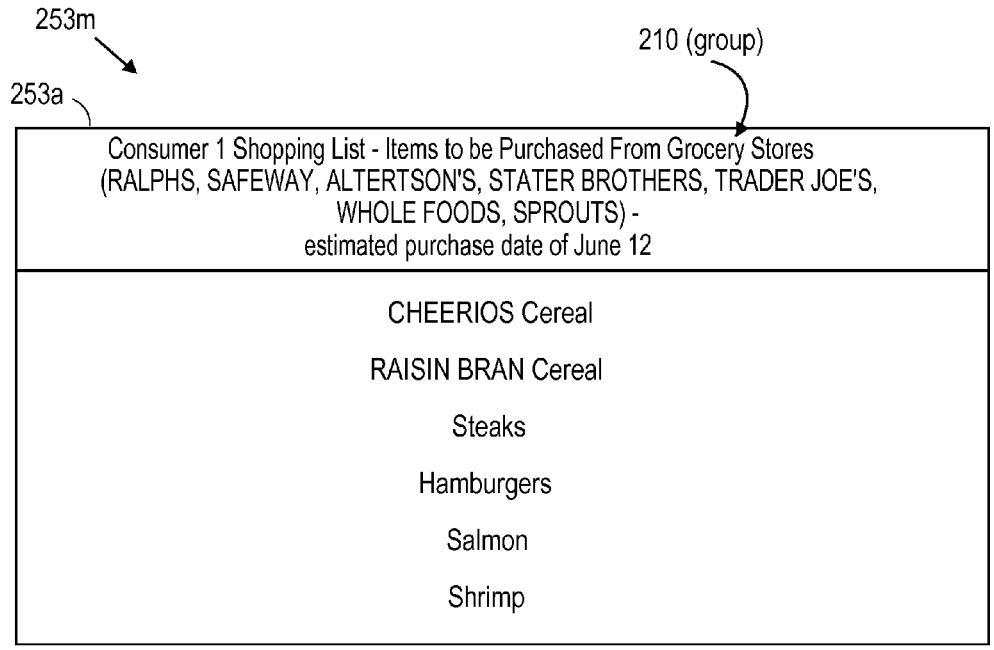
Figure 10B:
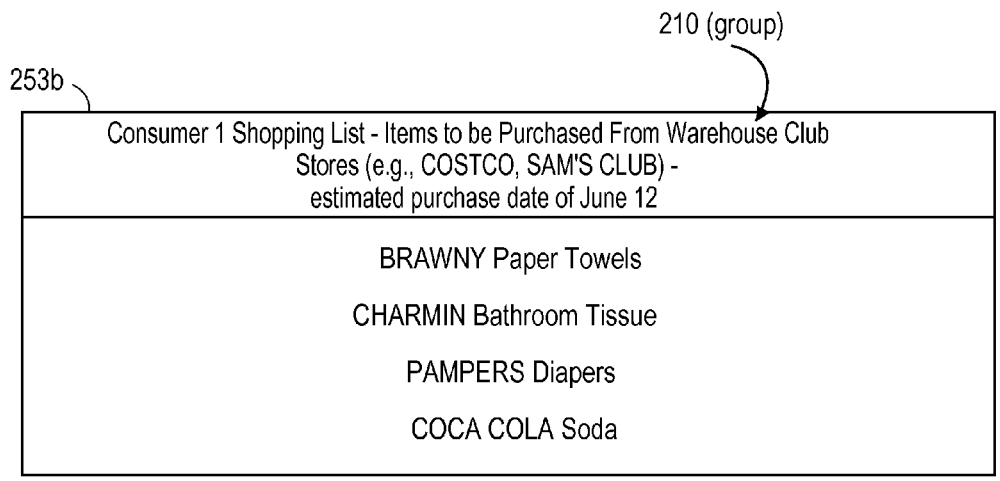

Referring to FIGS. 10A-B, according to another embodiment, shopping lists 253m may be for specific, individual merchants 210 and/or one or more shopping lists 253 may be generated for groups of merchants 210, e.g., a group of the same type of merchants 210. For example, FIG. 10A illustrates a first shopping list 253a including items to be purchased from one or more merchants 210 of a first group 1000a, and a second shopping list 253b including items to be purchased from one or more merchants of a second group 1000b of merchants. Thus, rather than generating a shopping list 253 specifically for RALPHS or specifically for COSTCO, a first shopping list 253a may include items to be purchased from RALPHS or other identified merchants 210 of the same type and in the group 1000a, e.g., SAFEWAY, ALBERTSON'S, STATER BROTHERS, etc. and a second shopping list 253b may include items to be purchased from COSTCO or other merchants 210 of the same type, e.g., SAM'S CLUB, etc. that are grouped together with COSTCO in shopping list 253b.

In this manner, for example, two separate shopping lists 253a,b (e.g., as shown in FIGS. 8A-B) for merchants 210 of the same type or within the same group 1000 of merchants 210 can be merged together or consolidated to such that items 212 that may be in different shopping lists 253 for different specific merchants 210 are segregated based on merchant type and included in the same shopping list for a group 1000 of merchants 210. Embodiments directed to generating shopping lists 253 based on groups 1000 of merchants 210 may be helpful if, for example, consumer 230 is not near a particular merchant 210 (e.g., SAFEWAY grocery store) but knows that the types of items 212 in a shopping list 253 are typically purchased by consumer 230 from similar merchants 210 (e.g., ALBERTSON'S grocery store) of the same type or within the same group.

Figure 11A:
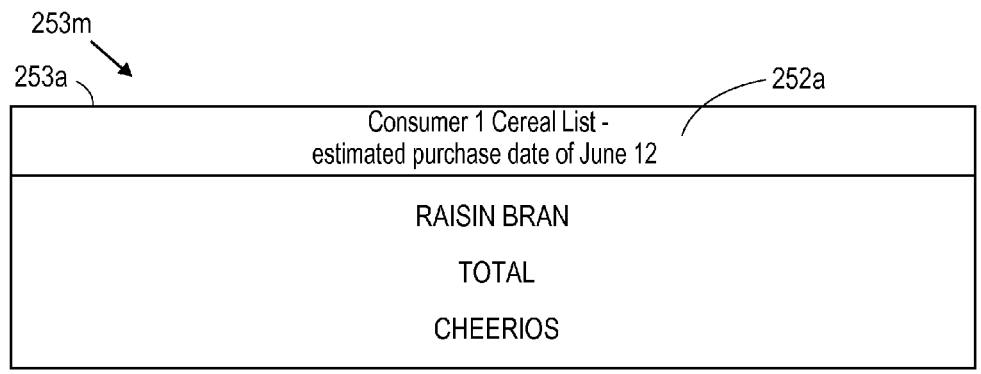
FIGS. 11A-C illustrate embodiments in which shopping lists are segregated by groups of items of the same type or category.
Figure 11B:
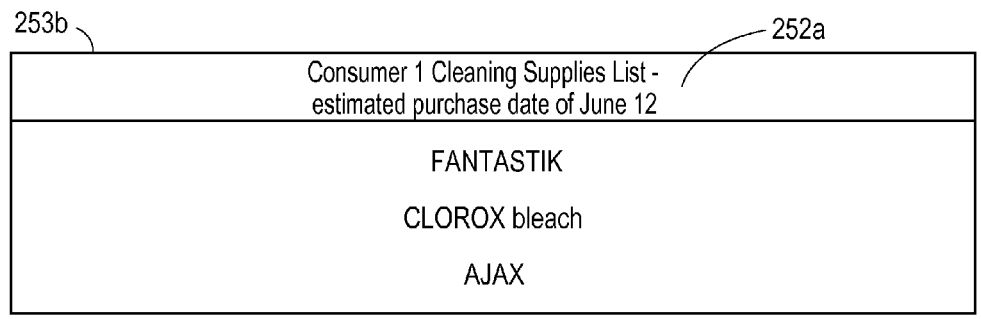
Figure 11C:
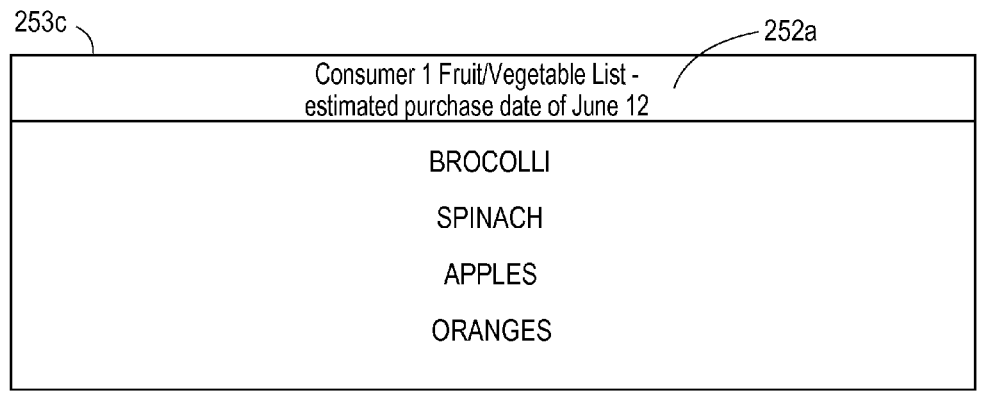

FIGS. 11A-C illustrate embodiments in which multiple shopping lists 253m are generated as described in embodiments above, except that a shopping list 253 may be segregated by type of item, and a shopping list 253 may identify a specific item. For example, FIG. 11A shows a shopping list 253a for "cereal" and shopping list 253b shows a shopping list 253b for "cleaning supplies." A shopping list 253 may include specific items and/or types or categories of items to be purchased from particular merchants 210. For example, FIG. 11C shows a shopping list 253c with types of "fruits and vegetables." These types of lists may be helpful when a consumer 210 is in a particular section of a store so that the items to be purchased in that particular section are included within a single shopping list 253. Such lists may also be segregated by merchant. For example, a "cleaning supplies" shopping list 253 may be generated for a warehouse club store, whereas a "fruits and vegetables" shopping list may be generated for a grocery store.

Referring again to FIG. 2A, and with continuing reference to FIG. 5, intermediate computer 225 may also be in communication with a computer 265 of a manufacturer or supplier 260 of an item 212s. In these embodiments, purchase interval program 254a can receive coupons 262 from manufacturers or supplies, store coupons 262 in database 251, and when items 212s are the subject of a message or shopping list 253 sent to consumer 230, consumer 230 can also receive coupons 262 for those specific items 212s at 508. Coupons 262 may also be mailed to consumer 230 in advance of estimated date 252.

Consumer 230, with shopping lists 253m segregated by merchant, merchant groups or item category, proceeds to purchase items 212s in the shopping list 253 and/or other items. If a specific item 212s in shopping list 253 is not needed at that time, consumer 230 can ignore that item 212s.

Figure 12:
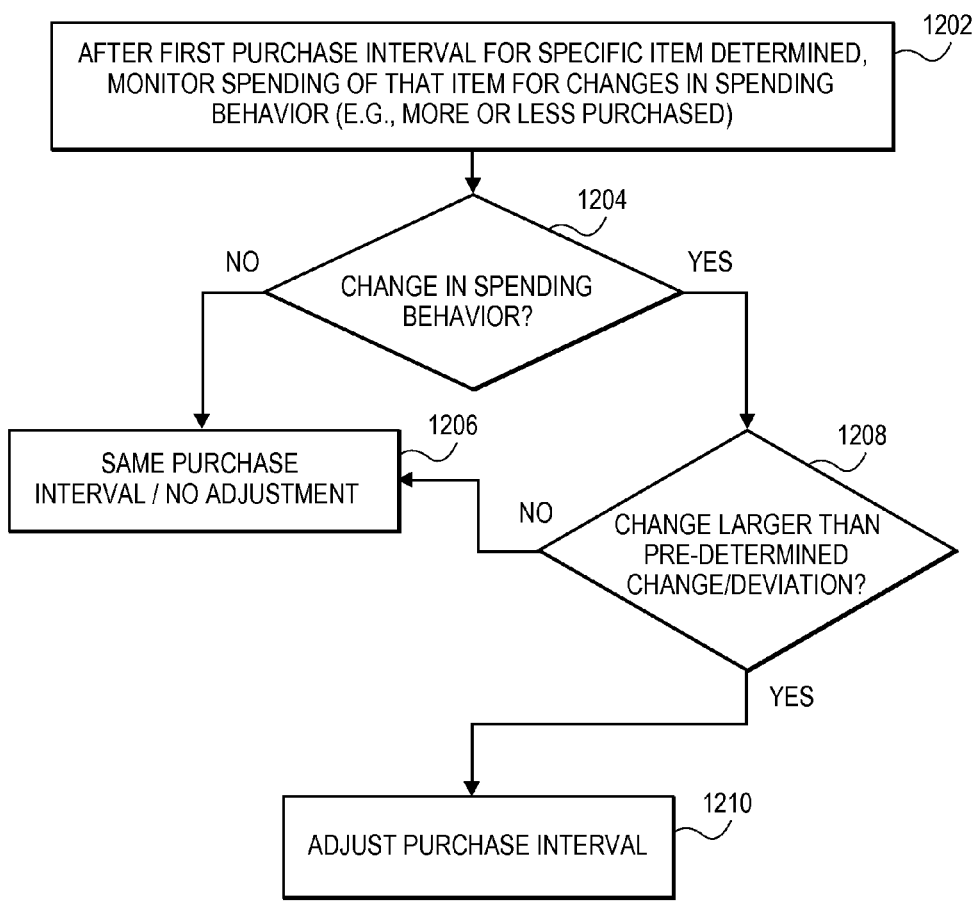
FIG. 12 is a flow chart of one embodiment of a method for monitoring consumer purchases after determination of a purchase interval to dynamically adjust purchase intervals based upon changes of consumer purchases of specific items.

Referring to FIG. 12, embodiments may also utilize a feedback to dynamically adjust purchase interval 251 and/or quantity of items purchased on a certain date or during a period of time based on changes in consumer 230 spending on a specific item 212s. For example, if a consumer 230 purchases diapers once every two weeks, consumer 230 may have had another baby, thus requiring additional diapers and resulting in consumer 230 purchasing diapers every week rather than every other week.

More particularly, at 1202, after purchase interval 250 is determined based upon an acceptable number of prior purchases, purchase interval program 254a continues to monitor consumer 230 spending on that specific item 212s. At 1204, purchase interval program 254a determines whether there is a change in spending behavior over time on that item 212s. If not, then at 1206, the original purchase interval 251 for that item 212s continues to be utilized. However, if a change in purchasing a specific item 212s has been detected, the original purchase interval 251 may continue to be used or be adjusted automatically as purchase activity changes. In other embodiments, purchase interval 251 is adjusted only if the change is sufficiently large and deviates from "normal" fluctuations thus indicating a substantial change in spending on the specific item. Thus, in these embodiments, at 1208, purchase interval program 254a determines whether purchase interval 251 change is greater than a pre-determined amount. If not, then the original purchase interval 251 continues to be utilized. If so, then at 1210, purchase interval program 254a can adjust purchase interval 251 and/or quantity of items to be purchased on a particular date, e.g., based upon an average number of items 212s purchased during a certain time as discussed above.

In one embodiment, purchase interval 251 is changed upon determining a change of spending on a particular item 212s. According to another embodiment, purchase interval program 254a analyzes item-level electronic transaction data 216 to determine whether there is a minimum or threshold number of purchases of the new spending pattern before changing the purchase interval 251.

Figure 13A:
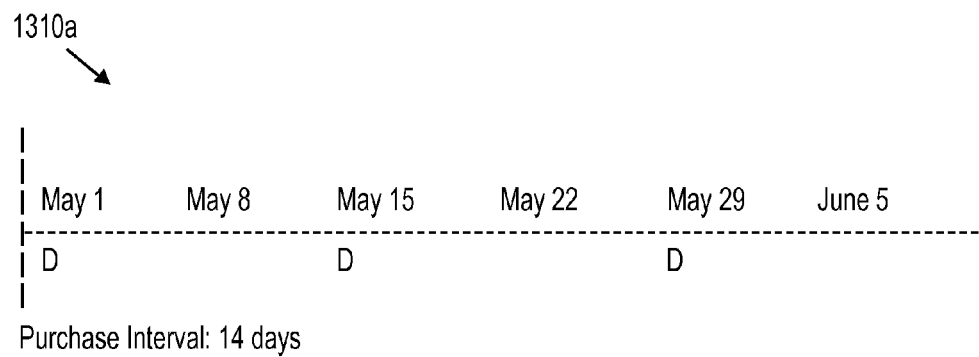
FIGS. 13A-B illustrate an example of how a purchase interval may be dynamically adjusted.
Figure 13B:
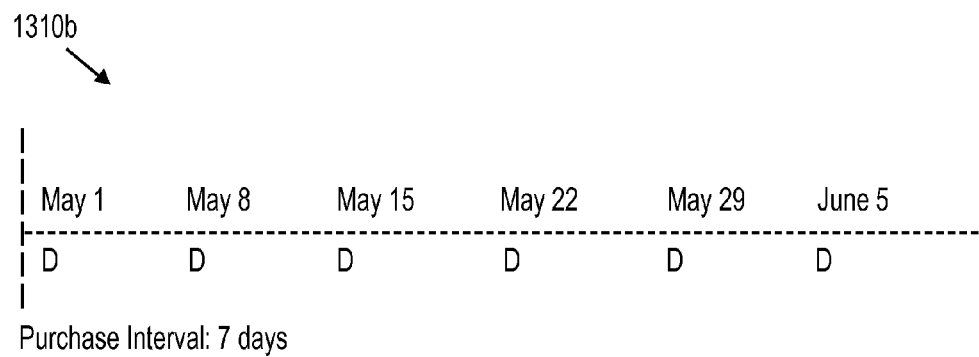

For example, referring to the timeline 1310a shown in FIG. 13A, and continuing with the example of consumer 230 purchasing diapers, consumer 230 initially purchased diapers on average once every two weeks. However, referring to the timeline 1310b shown in FIG. 13B, consumer 230 had another baby and now purchases diapers every week. This change is detected by purchase interval program 254a, and purchase interval 251 is dynamically adjusted to reflect additional diaper purchases and such that message or shopping list 253 provided to consumer 230 will be updated to reflect more frequent diaper purchases. These purchase interval 251 changes or adjustments are then analyzed by shopping list program 254b such that shopping lists 253m generated according to embodiments are adjusted and updated accordingly.

Figure 14:
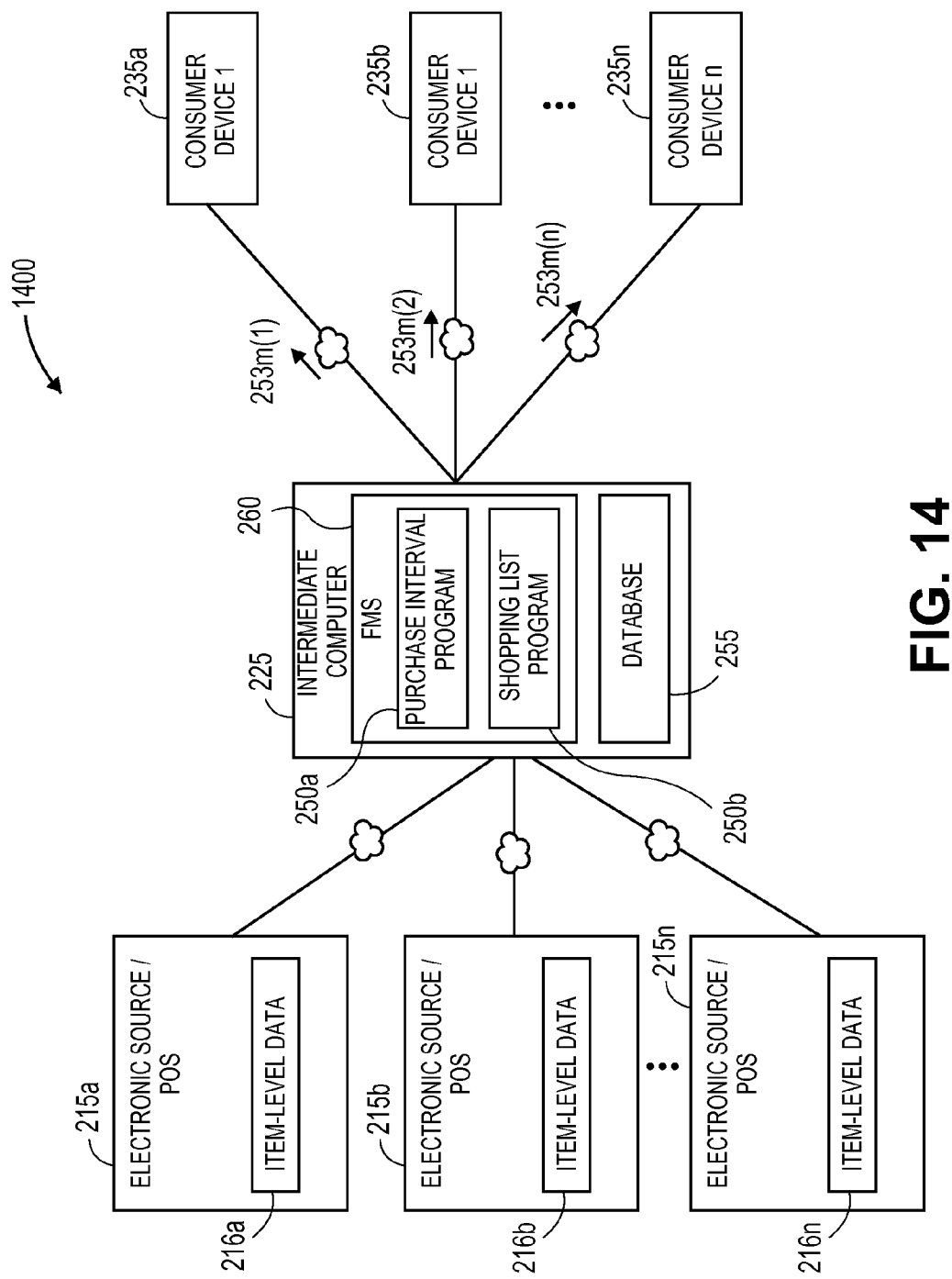
FIG. 14 illustrates how embodiments may be applied to generate multiple, segregated shopping lists for a plurality of consumers.

Referring to FIG. 14, while certain embodiments have been described with reference to specific items 212s purchased by a particular consumer 230, embodiments may apply to monitoring item-level spending and notifying multiple consumers 230n, e.g., two, three, ten, hundreds and thousands of consumers 230 who participate in a purchase tracking program of the host 220 or who purchase or sign up for the purchase interval program 254a and shopping list program 254b so that respective consumers 230 can receive respective segregated shopping lists 253 based on their respective purchase history and analysis performed by purchase interval program 254a.

Figure 15:
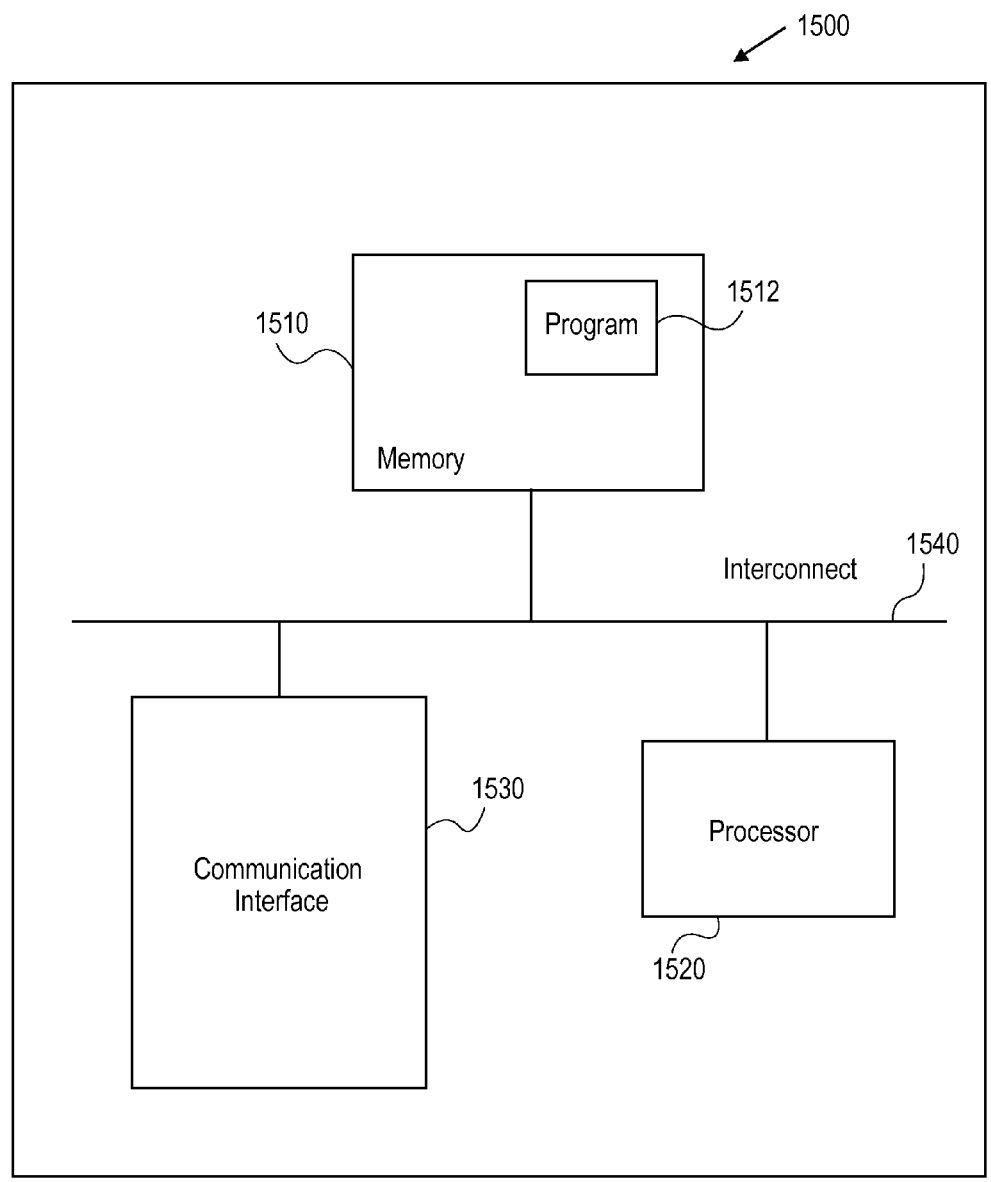
FIG. 15 is a block diagram of components of a computing apparatus or system in which various embodiments may be implemented or that may be utilized to execute embodiments.

FIG. 15 generally illustrates components of a computing device 1500 that may be utilized to execute embodiments and that includes a memory 1510, account processing program instructions 1512, a processor or controller 1520 to execute account processing program instructions 1512, a network or communications interface 1530, e.g., for communications with a network or interconnect 1540 between such components. The memory 1510 may be or include one or more of cache, RAM, ROM, SRAM, DRAM, RDRAM, EEPROM and other types of volatile or non-volatile memory capable of storing data. The processor unit 1520 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1040 may include a system bus, LDT, PCI, ISA, or other types of buses, and the communications or network interface may, for example, be an Ethernet interface, a Frame Relay interface, or other interface. The network interface 1530 may be configured to enable a system component to communicate with other system components across a network which may be a wireless or various other networks. It should be noted that one or more components of computing device 1500 may be located remotely and accessed via a network. Accordingly, the system configuration provided in FIG. 15 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1520 executes program instructions 1512 within memory 1510 and/or embodied on the carrier to implement method embodiments. Further, embodiments may reside and execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference items in the form of goods, embodiments may also involve items in the form of services or both good and services consumed by individuals and corporate and government entities.

Embodiments may involve purchase interval program and/or shopping list program that are stand alone programs or that are part of another system or program such as a financial management system that is in communication with merchant payment devices and/or financial institutions hosting consumer accounts.

While embodiments are described with reference to segregated shopping lists that identify particular brands (e.g., CHEERIOS and PAMPERS), shopping lists generated according to embodiments may also refer to good and services generally or by type or category, which may be determined from item-level electronic transaction data or categorized by purchase interval program or another program such as QUICKRECEIPTS. With such embodiments, for example, consumers may purchase the same specific items in the shopping list again (e.g., due to brand loyalty) or consumer may purchase other brands of products identified in shopping list. For example, shopping list may identify "diapers" or "PAMPERS" but consumer may purchase another brand of diapers such as HUGGIES because HUGGIES is on sale. In both cases, however, electronic shopping lists generated and sent to consumer according to embodiments notify consumer about which items should be purchased again.

Further, item level electronic transaction data sent to host computer can be stored based on various types of purchase including, but not limited to, credit card, debit card, check, electronic check, ATM withdrawal, ACH and other forms of electronic transactions. Receipt data that is sent to the host computer may also be generated as a result of cash purchases, and paper receipts can be scanned and processed for inclusion in the receipt database.

Moreover, it should be understood that a shopping list program may generate segregated or divided shopping lists based on various types of pre-determined criteria including merchant or store name, groups or types of merchants and item category, and combinations thereof.

Further, shopping list programs according to embodiments may be utilized to generate, store and distribute or transmit shopping lists generated for a particular merchant, for respective merchants, which may be the same or different types of merchants, for a type or category of merchant, for merchants within a group (e.g., based on being the same type or category), for item type or category, e.g., if certain types or categories of items are typically purchased from a grocery store whereas other types or categories of items are typically purchased from a big box store, and/or based on groups of merchants from whom items of a certain type or category can be purchased.

Additionally, while certain embodiments are described with reference to segregation criteria such as merchant-specific criteria, embodiments may also involve criteria of time, e.g., generating shopping lists for one month, two months, six months or one year from a current date, and such lists may also be segregated by merchant, groups, etc. as discussed above. Generation of segregated shopping lists on future dates may be useful for budgeting purposes, spending projections and spending analysis on a merchant, group or item basis.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for generating customized shopping lists for a consumer, the method being performed by an intermediate computer in communication with a computing device of a consumer and respective computers of respective electronic sources through respective networks, the method comprising:

the intermediate computer aggregating respective electronic transaction data from respective electronic sources, the aggregated item-level electronic transaction data representing respective prior purchases by the consumer from respective merchants;

the intermediate computer determining respective purchase intervals of a plurality of respective items purchased by the consumer from respective merchants, respective purchase intervals being based at least in part upon respective item-level electronic transaction data representing prior purchases of respective items by the consumer;

the intermediate computer determining respective estimated dates when the consumer will purchase respective items again based at least in part upon respective purchase intervals; and the intermediate computer generating a plurality of shopping lists for a particular estimated date, the plurality of shopping lists comprising respective items to be purchased by the consumer from respective different merchants based at least in part upon prior purchases by the consumer from the different merchants.

2. The method of claim 1, the plurality of shopping lists being segregated by merchant and identifying respective items to be purchased from respective merchants from whom respective items were previously purchased by the consumer.

3. The method of claim 1, the plurality of shopping lists comprising:
 a first shopping list including at least one item to be purchased from a first merchant, and
 a second shopping list including at least one item to be purchased from a second merchant.

4. The method of claim 3, the first merchant and the second merchant being the same type of merchant.

5. The method of claim 4, the merchant type comprising a grocery store, a warehouse club store, a big box or super store, or an on-line merchant.

6. The method of claim 3, the first merchant and the second merchant being different types of merchants.

7. The method of claim 6, the first merchant being a first type comprising a grocery store, a warehouse club store, a big box store or superstore or an on-line merchant, and the second merchant being a second type different than the first type.

8. The method of claim 7, the first type comprising a grocery store, and the second type comprising a type other than a grocery store.

9. The method of claim 1, the plurality of shopping lists comprising:
 a first shopping list including at least one item to be purchased from a first merchant comprising a grocery store,
 a second shopping list comprising at least one item to be purchased from a second merchant comprising a warehouse club store, and
 a third shopping list including at least one item to be purchased from a third merchant comprising a big box or super store.

10. The method of claim 9, wherein the at least one item on the first shopping list was previously purchased by the consumer from the grocery store, the at least one item on the second shopping list was previously purchased by the consumer from the warehouse club store, and the at least one item on the third shopping list was previously purchased by the consumer from a big box or super store.

11. The method of claim 1, the plurality of shopping lists comprising:

a first shopping list of items to be purchased from a first merchant based at least in part upon a first estimated date; and
 a second shopping list of items to be purchased from a second merchant based at least in part upon a second estimated date.

12. The method of claim 1, the plurality of shopping lists being segregated by groups of merchants, each group including a plurality of merchants and identifying items to be purchased from one or more merchants of that group.

13. The method of claim 12, the plurality of shopping lists comprising:
 a first shopping list for a first group of merchants, the first shopping list identifying a first group of items to be purchased from at least one merchant of the first group of merchants, and
 a second shopping list for a second group of merchants, the second shopping list identifying a second group of items to be purchased from at least one merchant of the second group.

14. The method of claim 13, wherein at least one item on each of the first and second shopping lists was previously purchased by the consumer from at least one merchant of respective first and second groups of merchants.

15. The method of claim 1, the plurality of shopping lists being segregated by item category such that a first shopping list for a first merchant includes items of a first category, and a second shopping list for a second merchant includes items of a second category.

16. The method of claim 15, the first category comprising food, and the second category comprising a category other than food.

17. The method of claim 15, the first shopping list identifying a first merchant from whom items of a first category are to be purchased, the second shopping list identifying a second merchant from whom items of a second category are to be purchased.

18. The method of claim 1, the intermediate computer receiving item-level electronic transaction data from a computer of a financial institution at which the consumer has an account.

19. The method of claim 1, the intermediate computer receiving item-level electronic transaction data comprising Level III data that specifically identifies items by name, description, code or symbol.

20. The method of claim 1, the intermediate computer receiving item-level electronic transaction data from an electronic payment device of a merchant.

21. The method of claim 1, wherein the intermediate computer is managed by a host other than a merchant that generated received electronic transaction data.

22. A system for generating customized shopping lists for a consumer, comprising:
 an intermediate computer in communication with a computing device of a consumer and respective computers of respective electronic sources through respective network;
 the intermediate computer being configured to
 aggregate respective electronic transaction data from respective electronic sources, the aggregated item-level electronic transaction data representing respective prior purchases by the consumer from respective merchants, determine respective purchase intervals of a plurality of respective items purchased by the consumer from respective merchants, respective purchase intervals being based at least in part upon respective item-level electronic transaction data representing prior purchases of respective items by the consumer;

determine respective estimated dates when the consumer will purchase respective items again based at least in part upon respective purchase intervals; and generate a plurality of shopping lists for a particular estimated date, the plurality of shopping lists comprising respective items to be purchased by the consumer from respective different merchants based at least in part upon prior purchases by the consumer from the different merchants.

23. The system of claim 22, the intermediate computer being configured to segregate the plurality of shopping lists by merchant and identify respective items to be purchased from respective merchants from whom respective items were previously purchased by the consumer.

24. The system of claim 22, the intermediate computer being configured to generate a first shopping list including at least one item to be purchased from a first merchant, and a second shopping list including at least one item to be purchased from a second merchant.

25. The system of claim 24, the first merchant and the second merchant being the same type of merchant.

26. The system of claim 25, the type comprising a grocery store, a warehouse club store, a big box or super store, or an on-line merchant.

27. The system of claim 24, the first merchant and the second merchant being different types of merchants.

28. The system of claim 27, the first merchant being a merchant of a first type comprising a grocery store, a warehouse club store, a big box store or superstore or an on-line merchant, and the second merchant being a second type different than the first type.

29. The system of claim 28, the first type comprising a grocery store, and the second type comprising a type other than a grocery store.

30. The system of claim 22, the intermediate computer being configured to generate a first shopping list including at least one item to be purchased from a first merchant comprising a grocery store, a second shopping list comprising at least one item to be purchased from a second merchant comprising a warehouse club store, and a third shopping list including at least one item to be purchased from a third merchant comprising a big box or super store.

31. The system of claim 30, the intermediate computer being configured to generate the plurality of shopping lists such that at least one item on the first shopping list was previously purchased by the consumer from the grocery store, the at least one item on the second shopping list was previously purchased by the consumer from the warehouse club store, and the at least one item on the third shopping list was previously purchased by the consumer from a big box or super store.

32. The system of claim 22, the intermediate computer being configured to generate a first shopping list of items to be purchased from a first merchant based at least in part upon a first estimated date; and a second shopping list of items to be purchased from a second merchant based at least in part upon a second estimated date.

33. The system of claim 22, the intermediate computer being configured to segregate the plurality of shopping lists by groups of merchants, each group including a plurality of merchants, and identify items to be purchased from one or more merchants of that group.

34. The system of claim 33, the intermediate computer being configured to generate a first shopping list for a first group of merchants, the first shopping list identifying a first group of items to be purchased from at least one merchant of the first group of merchants; and a second shopping list for a second group of merchants, the second shopping list identifying a second group of items to be purchased from at least one merchant of the second group.

35. The system of claim 34, the intermediate computer configured to generate the plurality of shopping lists such that at least one item on each of the first and second shopping lists was previously purchased by the consumer from at least one merchant of respective first and second groups of merchants.

36. The system of claim 22, the intermediate computer being configured to segregate the plurality of shopping lists by item category such that a first shopping list for a first merchant includes items of a first category, and a second shopping list for a second merchant includes items a second category.

37. The system of claim 36, the first category comprising food, and the second category comprising a category other than food.

38. The system of claim 36, the first shopping list identifying a first merchant from whom items of a first category are to be purchased, the second shopping list identifying a second merchant from whom items of a second category are to be purchased.

39. The system of claim 22, the intermediate computer being in communication with and configured to receive item-level electronic transaction data from a computer of a financial institution at which the consumer has an account.

40. The system of claim 22, the item-level electronic transaction data comprising Level III data that specifically identifies items by name, description, code or symbol.

41. The system of claim 22, the intermediate computer being in communication with and configured to receive item-level electronic transaction data from an electronic payment device of a merchant.

42. The system of claim 22, wherein the intermediate computer is managed by a host other than a merchant that generated electronic transaction data.

43. A computer program product comprising a non-transitory computer readable storage medium embodying one or more instructions executable by a computer to perform a process for notifying a consumer about recurring purchases of the same item, the process comprising aggregating respective item-level electronic transaction data from respective electronic sources, the aggregated item-level electronic transaction data representing respective prior purchases by the consumer from respective merchants, determining respective purchase intervals of a plurality of respective items purchased by the consumer from respective merchants, respective purchase intervals being based at least in part upon respective item-level electronic transaction data of recurring purchases of respective items; determining respective estimated dates when the consumer will purchase respective items again based at least in part upon respective purchase intervals; and generating a plurality of shopping lists for a particular estimated date, the plurality of shopping lists comprising respective items to be purchased by the consumer from different merchants based at least in part upon prior purchases by the consumer from the different merchants.

\* \* \* \* \*